US011982737B1

(12) United States Patent
Liu et al.

(10) Patent No.: US 11,982,737 B1
(45) Date of Patent: May 14, 2024

(54) CONTROLLING SENSITIVITY OF PRESENCE DETECTION USING ULTRASONIC SIGNALS

(71) Applicant: Amazon Technologies, Inc., Seattle, WA (US)

(72) Inventors: Yuzhou Liu, Mountain View, CA (US); Krishna Kamath Koteshwara, Santa Clara, CA (US); Rui Wang, Sunnyvale, CA (US); Harsha Inna Kedage Rao, Campbell/Santa Clara, CA (US); Tarun Pruthi, Fremont, CA (US); Trausti Thor Kristjansson, San Jose, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 400 days.

(21) Appl. No.: 17/363,302

(22) Filed: Jun. 30, 2021

(51) Int. Cl.
*G01S 15/04* (2006.01)
*G01S 7/539* (2006.01)

(52) U.S. Cl.
CPC .............. *G01S 15/04* (2013.01); *G01S 7/539* (2013.01)

(58) Field of Classification Search
CPC .......... G01S 15/04; G01S 7/539; G01S 11/14; G08B 13/1618; G08B 13/1645; H03F 1/0222
See application file for complete search history.

(56) References Cited

U.S. PATENT DOCUMENTS

| 2014/0293747 | A1* | 10/2014 | Calvarese | ............. G01S 15/523 367/95 |
| 2015/0154849 | A1* | 6/2015 | Matsui | ..................... G01S 17/04 342/28 |
| 2022/0221573 | A1* | 7/2022 | Felch | ...................... G01S 15/86 |

* cited by examiner

*Primary Examiner* — Omeed Alizada
(74) *Attorney, Agent, or Firm* — Lee & Hayes P.C.

(57) ABSTRACT

Techniques for presence-detection devices to vary presence-detection sensitivity to detect different types of movements by objects, such as major movements and minor movements, using ultrasonic signals. The devices detect movement of a person in an environment by emitting ultrasonic signals into the environment, and characterizing the change in the frequency, or the Doppler shift, of the reflections of the ultrasonic signals off the person caused by the movement of the person relative to the presence-detection devices. The presence-detection devices may control the presence-detection sensitivity in order to detect major movements, such as a user walking in a room, as well as objects minor movements, such as a user typing at a computer. By adjusting the presence-detection sensitivity, the devices are able to improve the overall accuracy of detecting the presence of users in an environment.

20 Claims, 12 Drawing Sheets

800 ⤴

```
┌─────────────────────────────────────────────────────────────────────────┐
│ ENTER A FIRST SENSITIVITY MODE, WHEREIN IN THE FIRST SENSITIVITY MODE   │
│ THE PRESENCE-DETECTION DEVICE IS CONFIGURED TO DETECT ONE OR MORE       │
│ MINOR MOVEMENTS OF ONE OR MORE OBJECTS                                  │
│ 802                                                                     │
└─────────────────────────────────────────────────────────────────────────┘
                                    ↓
┌─────────────────────────────────────────────────────────────────────────┐
│ CAUSE, AT A FIRST TIME, THE LOUDSPEAKER TO EMIT A FIRST ULTRASONIC      │
│ SIGNAL INTO AN ENVIRONMENT OF THE PRESENCE-DETECTION DEVICE             │
│ 804                                                                     │
└─────────────────────────────────────────────────────────────────────────┘
                                    ↓
┌─────────────────────────────────────────────────────────────────────────┐
│ GENERATE, AT LEAST PARTLY USING THE MICROPHONE, FIRST DATA              │
│ REPRESENTING A FIRST REFLECTED SIGNAL CORRESPONDING TO THE FIRST        │
│ ULTRASONIC SIGNAL, THE FIRST REFLECTED SIGNAL ORIGINATING AT AN         │
│ OBJECT IN THE ENVIRONMENT                                               │
│ 806                                                                     │
└─────────────────────────────────────────────────────────────────────────┘
                                    ↓
┌─────────────────────────────────────────────────────────────────────────┐
│ DETERMINE, AT LEAST PARTLY USING A FOURIER TRANSFORM ALGORITHM THAT     │
│ SAMPLES THE FIRST DATA AT A FIRST FREQUENCY RESOLUTION, FIRST FEATURE   │
│ DATA CORRESPONDING TO THE FIRST REFLECTION SIGNAL                       │
│ 808                                                                     │
└─────────────────────────────────────────────────────────────────────────┘
                                    ↓
┌─────────────────────────────────────────────────────────────────────────┐
│ DETERMINE, USING THE FIRST FEATURE DATA, A FIRST VALUE INDICATING A     │
│ FIRST LIKELIHOOD THAT THE FIRST FEATURE DATA REPRESENTS ONE OR MORE     │
│ MINOR MOVEMENTS                                                         │
│ 810                                                                     │
└─────────────────────────────────────────────────────────────────────────┘
                                    ↓
┌─────────────────────────────────────────────────────────────────────────┐
│ DETERMINE THAT THE FIRST VALUE IS GREATER THAN OR EQUAL TO A THRESHOLD  │
│ VALUE ASSOCIATED WITH DETECTION OF ONE OR MORE MINOR MOVEMENTS          │
│ 812                                                                     │
└─────────────────────────────────────────────────────────────────────────┘
                                    ↓
┌─────────────────────────────────────────────────────────────────────────┐
│ DETERMINE THAT THE OBJECT UNDERWENT A MINOR MOVEMENT BASED AT LEAST     │
│ IN PART ON THE FIRST VALUE BEING GREATER THAN OR EQUAL TO THE           │
│ THRESHOLD VALUE                                                         │
│ 814                                                                     │
└─────────────────────────────────────────────────────────────────────────┘
```

FIG. 8

CONTROLLING SENSITIVITY OF PRESENCE DETECTION USING ULTRASONIC SIGNALS

BACKGROUND

Many devices and technologies exist for detecting the presence of users in different environments, and for different purposes. For instance, motion-sensing lights are used to automate lighting control based on detecting motion, motion-sensing security devices can trigger alarms upon detecting motion, etc. These presence-sensing devices can utilize many different technologies to detect the presence and/or motion of a user in an environment, such as acoustic sensing, passive infrared sensing (PIR) sensing, Wi-Fi Channel Sate Information (CSI) sensing, radio-wave sensing, etc. To perform many of these types of presence sensing techniques, the presence-sensing devices are often equipped with specialized hardware, such as specialized sensors, specialized processors, etc. However, the different types of specialized hardware required by presence-sensing devices to detect presence or motion can be disadvantageous for many reasons, such as the high cost to include in devices, consumption of large amounts of power, emitting large amounts of heat, etc. Additionally, beyond being able to detect a user walking in an environment, existing presence-sensing devices are unable to detect other types of movement or activities in environments.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 8 illustrates a flow diagram of an example process for using ultrasonic signals to detect a minor movement of a user in an environment.

DETAILED DESCRIPTION

Figure 1:
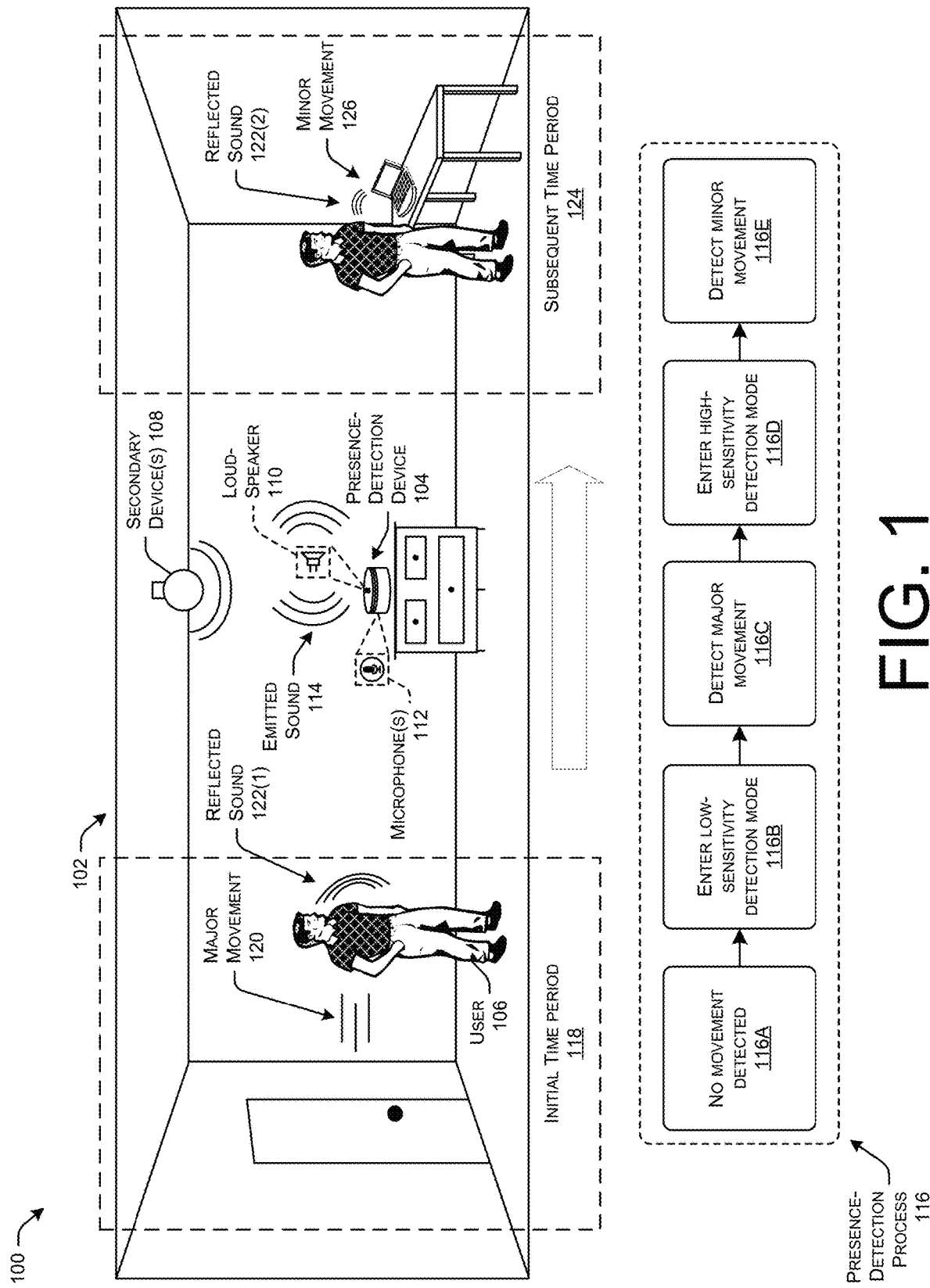
FIG. 1 shows an illustrative presence-detection device interactive architecture set in a home environment. The architecture includes a presence-detection device that has a loudspeaker and a microphone to detect presence, and/or lack of presence, of a user, and can control the presence-detection sensitivity to detect different types of movements, such as major movements, minor movements, and/or a combination thereof.

This disclosure describes, in part, presence-detection devices that can vary presence-detection sensitivity in order to detect different types of movements by objects, such as major movements and minor movements, using ultrasonic signals. The presence-detection devices detect movement of a person in an environment by emitting ultrasonic signals into the environment, and characterizing the change in the frequency, or the Doppler shift, of the reflections of the ultrasonic signals off the person caused by the movement of the person relative to the presence-detection devices. The presence-detection devices may include one or more classification models, such as machine-learning models, that are trained to detect the Doppler shift in reflections, as well as energy levels of the reflections, to identify different types of movements by objects in an environment. The presence-detection devices may control the presence-detection sensitivity in order to detect major movements of objects, minor movements of objects, and/or combinations of major and minor movements. For instance, the presence-detection devices may be configured to operate in different modes, such as a low-sensitivity mode where major movements are detected (e.g., a person walking into or through a room), a high-sensitivity mode where major and also minor movements are detected (e.g., a person reaching for a phone, turning the pages of a book, typing at a computer, etc.), and/or a normal-sensitivity mode where major and at least some minor movements are detected. By adjusting the presence-detection sensitivity, the devices are able to improve the overall accuracy of detecting the presence of users in an environment.

As describe herein, major movements (or "major motions") may generally include or correspond to movements of larger objects such as a person walking into or through an area. Conversely, minor movements (or "minor motions") may generally include or correspond to movements of smaller objects and/or objects moving at slower speeds, such as a user reaching for a telephone, turning the pages in a book, opening a file folder, picking up a coffee cup, typing at a computer, etc.

Generally, it is easier to detect the Doppler shift from high-speed, large moving objects because the frequency shift is positively correlated with the speed of movement, and the energy of the Doppler shift is positively correlated with the surface area of the moving parts. Thus, presence-detection systems may be able to more easily detect large objects that are moving at higher speeds, such as a user walking in a room at speeds around 1.5 meters per second (m/s) up to 2.5 m/s. However, users may not be making high-speed, full-body movements all the time they are present in a room. Rather, users may be making movements such as typing on a keyboard, using a remote control for a TV, writing, etc. These smaller movements, that are often made by smaller objects (e.g., fingers), are harder to detect, but often represent large portions of movement in a room by a person because user generally do not continuously walk around in rooms.

Accordingly, presence-detection devices and systems that are trained to detect major movements, or movements of large objects, may be able to detect a user entering a room, walking around the room, or leaving the room. However, if the user begins performing activities in which minor movements are performed, these presence-detection devices may be unable to determine if the user is in the room, and may incorrectly determine that user has left the room and perform an undesirable operation (e.g., turn off a light, activate a security system, etc.). The techniques described herein include adjusting the presence-detection sensitivity of presence-detection devices to be able to detect major movements of objects (e.g., movements of large objects) as well as minor movements of objects (e.g., movements of small objects).

Generally, presence-detection devices may be installed or placed in environments to monitor locations, such as rooms of a house. For instance, a presence-detection device may be a light switch that is installed in a room, a voice-interface device moved into a room to interact with a user through voice, a security-system device to monitor a location, etc. The presence-detection devices may periodically, or continuously, emit ultrasonic signals into a room to determine if a user is present in the room, or depending on the use-case, whether the room is vacant. The presence-detection devices may use the loudspeaker to pulse an ultrasonic signal at a determined carrier frequency, and analyze audio data generate by the microphone array to detect motion of an object. In some examples, the algorithms utilized by the presence-detection devices when analyzing the audio data to detect movement are based upon the Doppler Effect. Generally, the Doppler effect (or the Doppler shift) is the change (increase or decrease) in frequency or wavelength of a wave in relation to an object that is moving relative to the wave source. As an illustration, the Doppler effect is responsible for how a siren on an ambulance sounds louder and shriller as it approaches a person, and changes its pitch as soon as the ambulance passes the person.

To detect presence, the presence-detection devices uses one or more microphones to generate data that represents at least a reflection of the ultrasonic signal that is emitted into the environment by the loudspeaker. The presence-detection devices may capture data for a sufficiently long enough period of time to help ensure that the movement by a person may be detected using the reflection of the ultrasonic signal off the person as they move. Once the data is generated, the presence-detection devices may apply high-pass and/or low-pass filters to remove unwanted frequencies, and down-sample the data to a lower sampling or frequency for baseband processing as the data that represents the movement of the user is at a lower frequency range than the transmission frequency range.

In order to analyze the data to determine whether the reflection of the ultrasonic signal represented in the data indicates movement of a person due to a change in frequency according to the Doppler effect, the presence-detection devices may divide the signal represented in the audio data into its frequency components, or its magnitude and phase components. For instance, the presence-detection devices may utilize one or more algorithms, such as Fast Fourier transform (FFT), to transform the signal represented in the audio data in the time domain into the frequency domain, and represent the frequency of the reflected ultrasonic signal by the magnitude and phase components.

To determine whether the frequency response of the reflection of the ultrasonic signal indicates a reflection off of a moving object due to the Doppler effect, one or more machine-learning models may be trained and utilized as classifiers to indicate whether movement has been detected in the environment. For instance, a machine-learning model, such as a neural network, may be trained with training data, such as training data that is tagged as minor movement (such as typing) and training data tagged as major movement (such as walking). Generally, the training data may comprise feature vectors of magnitudes of reflections of different ultrasonic signals off of objects over a period of time (e.g., windowing and feature stacking to represent the period of time). In this way, the machine-learning models may be trained to identify input vectors as representing reflections of ultrasonic signals that reflected off a moving object, or that did not reflect off a moving object.

Generally, the machine-learning models, or any type of classification model, may be trained to determine whether feature data represents major movements or minor movements. Further, the classification models may output confidence values indicating a likelihood that the feature data represents a major movement or a minor movement. The confidence values may be used to determine whether a major movement or a minor movement has been detected, and different thresholds may be applied based the sensitivity mode in which a device is operating.

As an example, a presence-detection device may be able to operate in multiple modes, such as a low-sensitivity mode, a high-sensitivity mode, and/or a normal-sensitivity mode. In such examples, the low-sensitivity mode may be used when a user only desires that major movements are detected with high confidence (e.g., alerting a security system). Further, the high-sensitivity mode may be used in instances where a user desires that major and most minor movements are detected, such as when a user commonly performs minor movements in a room (e.g., typing, reading, watching TV, etc.) and desires that the presence-detection device err on the side of detecting movement to avoid unwanted operations (e.g., turning off the lights on the user, turning off the TV or appliances, etc.). Additionally, the normal-sensitivity mode may be used by a user when they desire that major movements as well as some minor movements may be detected.

In some instances, a user may be able to select which sensitivity mode in which they would like for their presence-detection device to operate. For instance, the user may access a user portal, such as an application, on a secondary device (e.g., phone, tablet, etc.) in order to manually select between the low-sensitivity mode, the high-sensitivity mode, the normal sensitivity mode, and/or an automated-sensitivity mode. The presence-detection device may operate in the mode that is selected by the user, and when the user does not make a selection, may operate in a default mode (e.g., in the normal-sensitivity mode).

In some instances, to determine whether reflections of the ultrasonic signals off an object indicate minor movements or major movements, the extraction of the feature data may differ based on what sensitivity mode the device is in. Generally, in a low-sensitivity mode in which the presence-detection device is detecting major movements, the presence-detection device may extract and analyze feature data differently than when the presence-detection device is in a high-sensitivity mode in which the device is detecting major and minor movements.

For instance, in the low-sensitivity mode, the presence-detection device may generate any process feature data such that the resulting feature data that is input into the machine-learning (ML) models captures larger Doppler shifts that are represented as higher frequencies on the frequency axis. As a specific example, a 96 kilohertz (kHz) signal may be transformed and modulated to a 2 kHz baseband signal where the ultrasonic carrier frequency is shifted to 500 Hz. In the low-sensitivity mode, a 256-point Fourier transform is applied with a window size of 256 and a hop size of 128. The resulting features are then pruned to cover 256 Hz of the carrier frequency. The 256-point size indicates the number of samples, or the "frequency resolution," used by the Fourier transform where the higher number of points, the greater the frequency resolution. The number of points generally corresponds to the number of "bins" of feature data generated by the Fourier transform.

In this specific example where the presence-detection device is operating in the low-sensitivity mode, the device can detect major movements, such as movements of large objects, such as users walking at speeds around 1 m/s to 1.5 m/s, users running at speeds around 3 m/s to 7 ms, a ball being thrown by a user, a pet walking or running in the environment, etc. Generally, the major movements will correspond to movements made by larger objects (e.g., larger pets, humans, etc.), and major movements may be at higher speeds (e.g., in a range of around 1 m/s to 10 m/s for running). The feature data may be input into the ML model frame-by-frame (e.g., 100 ms portions), and the ML model may be trained to output probabilities that the feature data represents major movement or not. The probabilities for one or more frames may be compared to thresholds to determine whether or not major movement has been detected. Generally, the ML model may analyze the shift in frequency caused by the Doppler shift, and/or the energy values, to determine whether the feature data represents major movements, minor movements, and/or no movement.

Following the example above, in the high-sensitivity mode the presence-detection device may perform a 512-point Fourier transform having a window size of 512 and a hop size of 128. Rather than the 256-point transform taken in the low-sensitivity mode, the 512-point Fourier transform will represent the Doppler shifts with a higher frequency resolution. In this example, the middle 64 frequency bins (minus 5 central bins which represents primarily carrier frequency leakage) is utilized to generate feature data. The feature data generated in the high-sensitivity mode has the same general shape as the feature data generated in the low-sensitivity mode, but it covers ±129 Hz of the carrier frequency rather than the ±256 Hz covered by the feature data in the high-sensitivity mode. Therefore, a minor movement, which may be at speeds of between 0.2 m/s and 1.5 m/s, in the high-sensitivity feature data now corresponds to 8 bins of the 64 bins in the feature domain, as compared to 4 bins in the feature data generated in the low-sensitivity mode. Additionally, the 512-point Fourier transform may be configured to other frequency resolutions, such as a 1,024-point Fourier transforms. The feature data with the higher resolution may be fed into the ML model(s) on a frame-by-frame basis, and the ML model(s) may output probabilities as to whether the feature data frames indicate minor movement.

In some instances, feature data may be generated for both the low-sensitivity and high-sensitivity modes for reflections of ultrasonic signals, and may be input into the ML model(s) to detect minor movements or major movements. In such examples, the ML model(s) may be trained to identify major and minor movements from feature data as described herein.

As noted above, the presence-detection devices may operate the high-sensitivity mode, low-sensitivity mode, normal-sensitivity mode, and/or an automated-sensitivity mode based on user input. For instance, a user of the presence-detection device may provide input indicating that they would like the presence-detection device to operate in one of the modes, and/or indicate how the presence-detection device is to transition between the modes. For instance, the presence-detection device may be configured by users to run in certain modes at certain times of the day (e.g., low-sensitivity mode at night), run in certain modes based on what movement is detected (e.g., transition from low-sensitivity into high-sensitivity when major movement is detected), and so forth.

In the automated-sensitivity mode, the presence-detection device may generally operate in the low-sensitivity mode when motion has not been detected for a period of time (e.g., 1 minute, 5 minutes, 10 minutes, etc.), and the presence-detection device has determined that there is not a user in the room. While in the low-sensitivity mode, the presence-detection device is attempting to detect major movements, such as a user entering the room. The presence-detection device may continuously, or periodically, emit ultrasonic signals and use a microphone to generate data representing reflections of the signals off of objects. As noted above, the shift in the frequency caused by the Doppler shift is greater when the objects are moving faster, and the energy of the Doppler shift is greater when the surface area of the object is greater. Thus, a user entering or leaving a room will correlate to a greater frequency shift having greater energy.

In some instances, if major movement is detected then the presence-detection device may transition from the low-sensitivity mode into a high-sensitivity mode during which the device detects major as well as minor movements. As noted above, minor movements are low-speed movements that result in smaller Doppler shifts. To detect these minor movements in the high-sensitivity mode, the presence-detection device may effectively "zoom in" the frequency axis to focus on the smaller Doppler shifts. To achieve this, the presence-detection devices may extract and generate the feature data differently than in the low-sensitivity mode.

While the techniques described herein may be applied and useful in many scenarios, the presence-detection devices may perform various operations upon detecting movement of a person. For instance, the presence-detection devices may cause various secondary devices to turn on or off (e.g., lights, television, security alarm, etc.), optimize the output of music data to create auditory "sweet spots" for the person as they move through the room, perform more effective beamforming techniques based on the location and/or movement of the user, and so forth.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 shows an illustrative architecture 100 including a home environment 102 in which a presence-detection device 104 is located in the home environment 102 to detect presence of a user 106. The architecture 100 includes at least one presence-detection device 104 controlling secondary devices 108 (e.g., television 108(1), light 108(2), or any other controllable device) physically situated in the home 102 based on detecting presence of the user 106. In this example, the presence-detection device 104 includes or comprise a voice-activated device that has a loudspeaker 110 and one or more microphones 112 to detect presence, and/or lack of presence, of the user 106, and can control the presence-detection sensitivity to detect movements at different speeds.

As shown in FIG. 1, the loudspeaker 110 of the presence-detection device 104 may transmit, or otherwise output, an emitted sound 114. Generally, the loudspeaker 110 may comprise any type of electroacoustic transducer that convers an electric audio signal into a corresponding sound. Generally, the loudspeaker 110 may be an existing on-board speaker configured to output sound within frequency ranges that are audible to humans, such as 35 Hz-20 kHz. However, in the illustrated example the emitted sound 114 may include at least a pulsed, or a continuous, emission of sound 114 at a frequency that is outside the frequency range in which humans can hear sound (e.g., over 20 kHz). Thus, the loudspeaker 110 may be emitting sound 114, such as ultrasonic signals, that may be traditionally out-of-band for the loudspeaker 110. As illustrated, FIG. 1 may represent a high-level the presence-detection process 116 performed by the presence-detection device 104 in order to detect movements of an object, such as the user 106.

The presence-detection device 104 may cause the loudspeaker 110 to emit the ultrasonic sound (e.g., emitted sound 114) into the home 102. In some examples, the presence-detection device 104 may continuously cause the loudspeaker 110 to emit the ultrasonic sound 114, while in other examples, the ultrasonic sound 114 may be emitted periodically, or pulsed. Upon being emitted, the sound 114 will generally reflect off of objects in the home 102. As briefly mentioned above, when the emitted sound 114 bounces off objects, various changes to the characteristics of the audio signal may occur. For instance, as mentioned above, the Doppler effect (or Doppler shift) is one such change in audio signal characteristics where the frequency or wavelength of a wave, such as an emitted sound wave 114, changes in relation to an emitting object upon bouncing off of a moving object. In the illustrated example, the emitted sound 114 may experience a change in frequency upon reflecting off the user 106 if the user 106, or a part of the user 106, is moving.

The presence-detection device 104 may use the microphone(s) 112 to generate data representing the reflected ultrasonic sound 122. In some examples, the microphone(s) 112 may include two or more microphones arranged on, or in, the presence-detection device 104 in any pattern (e.g., rows of microphones, circular pattern on a surface, offset and/or alternating rows of microphones, etc.). Further, the microphones in the microphone(s) 112 may be facing, or oriented, in different directions to capture sound from different directions with a better signal-to-noise ratio. Additionally, or alternatively, the presence-detection device 104 may performing acoustic processing on audio data/signals generated by the microphones of the microphone(s) 112 in order to perform beamforming to perform directional signal/sound reception in the home environment 102. In this way, the microphones in the microphone(s) 112 may be configured to detect sound from different regions of the home 102 with stronger SNR values. Generally, the microphones of the array 112 may comprise transducers that convert sound (e.g., reflected sound 122) into electrical signals, or audio data.

At 116A, the presence-detection device 104 may determine that there is no movement detected in the home 102. For instance, the presence-detection device 104 may process reflections of the emitted sound 114 for a period of time (e.g., 5 minutes, 20 minutes, etc.) do not have any shifts or changes in the frequency caused by movement, and that there is no movement in the room 102.

In such examples, at 116B the presence-detection device 104 may enter into a low-sensitivity detection mode during which the presence-detection device 104 is attempting to detect major movements. The presence-detection device 104 may continue to analyze reflections of the emitted sounds 114 to determine whether there is a major movement by an object in the room 102, such as the user 106 entering or walking around the room 102. The presence-detection device 104 may analyze feature data that have been sampled at a particular point size by a Fourier transform to result in feature data that have a frequency resolution for detecting major movements.

Generally, when there is movement by the user 106, the reflected sound 122 (or reflected signal) may experience a change in frequency. If the movement 120 of the user 106 is towards the loudspeaker, then the reflected sound 122 may have a higher frequency compared to the emitted sound 114 when detected at the presence-detection device 104. Conversely, the reflected sound 122 may have a lower frequency relative to the presence-detection device 104 compared to the emitted sound 114 when the movement 120 of the user 106 is away from the presence-detection device 104.

At 116C, the presence-detection device 104 may detect major movement 120 by the user 106 in an initial time period 118 by analyzing the reflected sound 122(1). In the low-sensitivity mode, the presence-detection device 104 may generate any process feature data such that the resulting feature data that is input into the machine-learning (ML) models captures larger Doppler shifts that are represented as higher frequencies on the frequency axis. As a specific example, a 96 kilohertz (kHz) signal may be transformed and modulated to a 2 kHz baseband signal where the ultrasonic carrier frequency is shifted to 500 Hz. In the low-sensitivity mode, a 256-point Fourier transform is applied with a window size of 256 and a hop size of 128. The resulting features are then pruned to cover ±256 Hz of the carrier frequency. The 256-point size indicates the number of samples, or the "frequency resolution," used by the Fourier transform where the higher number of points, the greater the frequency resolution. The number of points generally corresponds to the number of "bins" of feature data generated by the Fourier transform.

In this specific example where the presence-detection device 104 is operating in the low-sensitivity mode, the device can detect major movements 120 of the user 106 or other large objects, such as large objects that are often moving at speeds around 1 m/s to 1.5 m/s. The feature data may be input into the ML model frame-by-frame (e.g., 1 ms portions, 10 ms portions, 100 ms portions, etc.), and the ML model may be trained to output probabilities that the feature data represents major movement or not. The probabilities for one or more frames may be compared to thresholds to determine that major movement has been detected. Generally, to detect a major movement and/or a minor movement, the energy values for the frequency shifts (or Doppler shifts) may be analyzed to help characterize the shifts as major movement or minor movement. The greater the energy values, the more likely that the Doppler shifts are major movements, and smaller energy values generally represent minor movements. The ML models may be trained with training data to identify energy values that resemble or correspond to energy values for ground-truth major movements, and with training data to identify energy values that resemble or correspond to energy values for ground-truth minor movements.

At 116D, the presence-detection device 104 may enter into a high-sensitivity detection mode at least partly in response to detecting the major movement 120. The presence-detection device 104 may continue to analyze reflections of the emitted sounds 114 to determine whether there are minor movements of objects in the room 102, such as the user 106. The presence-detection device 104 may analyze feature data that have been sampled at a particular point size by a Fourier transform to result in feature data that have a frequency resolution for detecting minor movements.

As noted above, minor movements are low-speed movements that result in smaller Doppler shifts. To detect these minor movements in the high-sensitivity mode, the presence-detection device 104 may effectively "zoom in" the frequency axis to focus on the smaller Doppler shifts. To achieve this, the presence-detection device 104 may extract and generate the feature data differently than in the low-sensitivity mode versus the high-sensitivity mode.

As an example, in the high-sensitivity mode, the presence-detection device may perform a 512-point Fourier transform having a window size of 512 and a hop size of 128. Rather than the 256-point transform taken in the low-sensitivity mode, the 512-point Fourier transform will represent the Doppler shifts with a higher frequency resolution. In this example, the middle 64 frequency bins (minus 5 central bins which represents primarily carrier frequency leakage) is utilized to generate feature data. The feature data generated in the high-sensitivity mode has the same general shape as the feature data generated in the low-sensitivity mode, but it covers ±129 Hz of the carrier frequency rather than the ±256 Hz covered by the feature data in the high-sensitivity mode. Therefore, a minor movement, often with a movement speed around 0.2 m/s, in the high-sensitivity feature data now corresponds to 8 bins of the 64 bins in the feature domain, as compared to 4 bins in the feature data generated in the low-sensitivity mode. Additionally, the 512-point Fourier transform may be configured to other frequency resolutions, such as a 1,024-point Fourier transforms. The feature data with the higher resolution may be fed into the ML model(s) on a frame-by-frame basis, and the ML model(s) may output probabilities as to whether the feature data frames indicate minor movement 126.

At 116E, the presence-detection device 104 may detect minor movement, and/or potentially major movement, in the environment. Generally, when the presence-detection device 104 detects movement, whether it is minor or major, a timer may reset and the presence-detection device 104 may stay in the high-sensitivity mode for a threshold period of time. The timer may be set for different times (e.g., 1 minute, 5 minutes, 15 minutes, etc.) such that, upon expiration of the timer, the presence-detection device 104 may transition back into the low-sensitivity mode at 116B. However, if minor movement and/or major movement is detected by the presence-detection device 104 within the threshold period of time set by the timer, then the timer may be reset and the presence-detection device 104 may stay in the high-sensitivity mode until the timer expires, or until movement is detected and the timer is reset. In this way, the presence-detection device 104 may err on the side of staying in the higher-sensitivity mode by resetting the timer, which reduces false alarms (e.g., turning off the lights when a user is in the room, but not moving as frequently).

Further, although the techniques of the automatic mode are described with respect to moving or transitioning between the low-sensitivity mode and the high-sensitivity mode, the techniques are equally applicable for moving between the normal-sensitivity mode and the high-sensitivity mode. That is, the presence-detection device 104 may be in the normal-sensitivity mode when movement has not been detected for a threshold period of time, and the presence-detection device 104 may be detecting major movements and some minor movements in the normal-sensitivity mode. Once a movement is detected, either major or minor, the presence-detection device 104 may transition into the high-sensitivity mode to more accurately detect minor movements. Thus, the techniques are equally applicable for high-sensitivity modes as well as normal-sensitivity modes.

Figure 2:
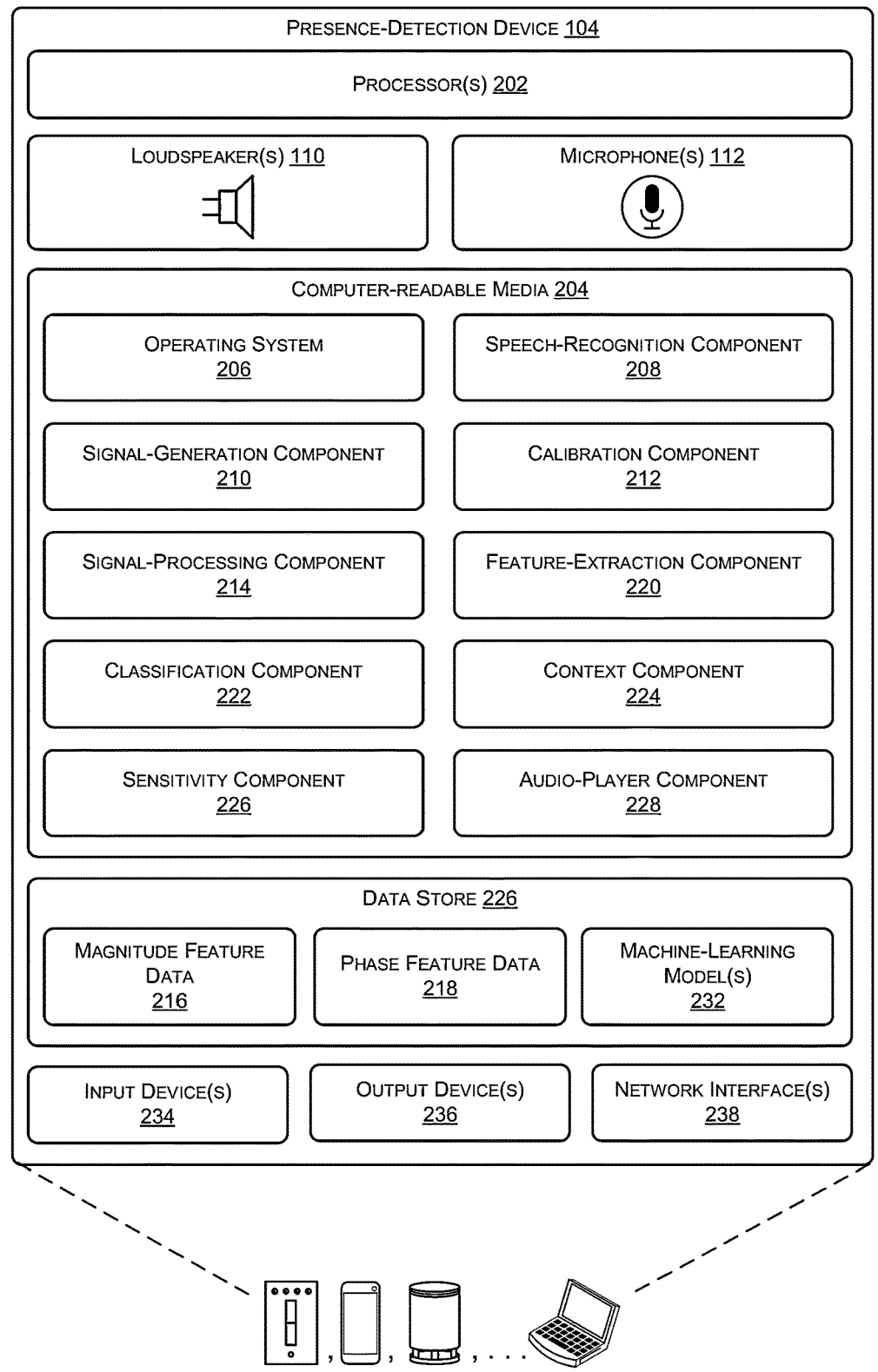
FIG. 2 illustrates an example configuration of components of a presence-detection device.

FIG. 2 illustrates an example configuration of components of a presence-detection device 104. Generally, the presence-detection device 104 may comprise any type of device, such as a fixed computing device (e.g., light switch, appliance, etc.), and/or a portable or mobile device such as voice-controlled devices, smartphones, tablet computers, media players, personal computers, wearable devices, various types of accessories, and so forth.

The presence-detection device 104 may include one or more processors 202 configured to execute various computer-executable instructions stored on the presence-detection device 104. Further, the presence-detection device 104 may include one or more loudspeakers 110 positioned at one or more locations on the presence-detection device 104. The loudspeakers 110 may include one loudspeaker 110, and/or an array of loudspeakers configured to coordinate the output of sound. The loudspeakers 110 may comprise any type of electroacoustic transducer which converts an electronic audio signal (e.g., audio data) into corresponding sound represented by the audio signal. In some examples, the loudspeaker(s) 110 may be simple onboard speakers designed to output sound in frequency ranges that are audible to humans, rather than being specialized ultrasonic transducers. However, in other examples the loudspeaker(s) 110 may be specialized ultrasonic transducers depending on the presence-detection device 104.

The presence-detection device 104 may further include the microphone(s) 112 that comprise one or more microphones which may include transducers that convert sound into an electrical audio signal. The microphone(s) 112 may include any number of microphones that are arranged in any pattern. For example, the microphone(s) 112 may be arranged in a geometric pattern, such as a linear geometric form, circular geometric form, or any other configuration. As an example, an array of four microphones may be placed in a circular pattern at 90-degree increments (e.g., 0, 90, 180, 270) to receive sound from four directions. The microphone(s) 112 may be in a planar configuration, or positioned apart in a non-planar three-dimensional region. In some implementations, the microphone(s) 112 may include a spatially disparate array of sensors in data communication. For example, a networked array of sensors may be included. The microphone(s) 112 may include omni-directional microphones, directional microphones (e.g., shotgun microphones), and so on.

The presence-detection device 104 may further include computer-readable media 204 that may be used to store any number of software and/or hardware components that are executable by the processor(s) 202. Software components stored in the computer-readable media 204 may include an operating system 206 that is configured to manage hardware and services within and coupled to the presence-detection device 104. The computer-readable media may store a speech-recognition component 208 that, when executed by the processor(s) 202, perform speech-recognition on processed audio signal(s) to identify one or more voice commands represented therein. For instance, the speech-recognition component 208 may convert the audio signals into text data using automatic-speech recognition (ASR), and determine an intent for voice commands of the user 106 using natural-language understanding (NLU) on the text data. Thereafter, a command processor, stored in the computer-readable media 204 (and/or at a remote network-based system), may cause performance of one or more action in response to identifying an intent of the voice command. In the illustrated example, for instance, the command processor may issue an instruction to control a secondary device 108. For instance, the command processor may issue one or more instructions to a television 108(1) to show the weather channel, sends an instruction to dim the light 108(2), and/or output music using a loudspeaker 110.

The computer-readable media 204 may further store a signal-generation component 210 that, when executed by the processor(s) 202 generate audio signals/data that represent sound to be output by the loudspeaker(s) 110. The signal-generation component 210 may, for example, generate audio data representing ultrasonic signals that are output by the loudspeaker(s) 110 at a frequency that is above the audible range of humans. The signal-generation component 210 may generate ultrasonic signals at various power levels depending on, for example, a size of a room that the presence-detection device 104 is in. Further, the signal-generation component 210 may generate ultrasonic signals that are converted into sound by the loudspeaker(s) 110 according to various timing implementations, such as a continuously emitted sound, a pulsed sound, a periodically pulsed sound, etc. In some examples, the signal-generation component 210 may be configured to generate a calibration signal, such as an audio sweep signal, to determine audio characteristics of a room or other environment of the presence-detection device 104.

The computer-readable media 204 may further store a calibration component 212 configured to, when executed by the processor(s) 202, determine audio characteristics of an environment of the presence-detection device 104 and/or frequencies at which to output sound by the loudspeaker(s) 110. In some examples, the calibration component 212 may cause the signal-generation component 210 to generate audio data representing a calibration tone, such as an ultrasonic sweep signal, to determine audio characteristics of the environment of the presence-detection device 104. The calibration component 212 may perform device calibration to determine an optimal frequency range for ultrasonic signals to be emitted by the loudspeaker(s) 110 into the environment. In some examples, the calibration component 212 may cause the signal-generation component 210 to generate an ultrasonic sweep signal that, when converted into sound by the loudspeaker(s) 110, emits a sound over a period of time at a range of ultrasonic frequencies (e.g., 27 kHz-23 k Hz). The calibration component 212 may also activate at least one microphone in the microphone(s) 112 to generate audio data representing the ultrasonic sweep signal, and determine an optimal frequency range/bin for the environment. For instance, the calibration component 212 may analyze various frequency ranges included in the total frequency range of the ultrasonic sweep signal and determine signal-to-noise (SNR) values for one or more frequency ranges. The calibration component 212 may determine which sub-frequency range in the total frequency range of the ultrasonic sweep signal has the best SNR value.

In some examples, the calibration component 212 may cause utilize the ultrasonic sweep signal upon installation of the presence-detection device 104, after detecting movement, or the end of movement, using a sensor of the presence-detection device 104, and/or periodically in order to determine an optimal frequency at which to emit ultrasonic signals into an environment of the presence-detection device 104.

In some examples, the calibration component 212 may perform more passive techniques for determining acoustic characteristics of an environment of the presence-detection device 104. For instance, the calibration component 212 may, at least periodically, simply utilize at least one microphone in the microphone(s) 112 to generate audio data while the loudspeaker(s) 110 is not outputting sound. The calibration component 212 may analyze that audio data to determine background noise or sound in the environment of the presence-detection device 104. In this way, the calibration component 212 may detect noise that may be caused by other objects in the environment (e.g., television, ceiling fan, vacuum cleaner, etc.) that may interfere with analyzing audio data representing ultrasonic signals. In this way, the calibration component 212 may determine a background noise profile or signature that may later be used to help identify portions of audio data that represent reflections of the ultrasonic signal, rather than background noise. The calibration component 212 may provide an indication of a frequency at which to emit ultrasonic signals to the signal-generation component 210 in order to generate audio data/signals that represent the ultrasonic signals when converted by the loudspeaker(s) 110. In this way, the loudspeaker(s) 110 may emit ultrasonic signals that are at a more optimized frequency range based on audio characteristics of the environment.

The computer-readable media 204 may further include a signal-processing component 214 that, when executed by the processor(s) 202, perform various operations for processing audio data/signals generated by the microphone(s) 112. For example, the signal-processing component 214 may include components to perform low-pass filtering and/or high-pass filtering to ensure that speech and other sounds in the spectrum region of the ultrasonic signal does not affect baseband processing. For instance, the signal-processing component 214 may performing high-pass filtering for the audio data received in each audio channel for respective microphones in the array 112 to remove sounds at lower frequencies that are outside or lower than of the frequency range of the ultrasonic signal and/or reflected signals that have shifted, such as speech (e.g., 100 Hz, 200 Hz, etc.) or other sounds in the environment. Further, the signal-processing component 214 may perform baseband carrier shifts (e.g., at 96 kHz) to shift or modulate the audio signal back to baseband frequency from the carrier frequency (e.g., 46 kHz, 21 kHz, etc.). Additionally, the signal-processing component 214 may perform low-pass filtering for each audio signal generated by each microphone in the array 112 after the baseband carrier shift to remove signals from the audio signals that are higher than a certain cutoff frequency that is higher than audio signals representing the ultrasonic signal (e.g., a cutoff frequency of than 30 kHz, 23 kHz, 35 kHz, and/or any other cutoff frequency higher than the ultrasonic signal frequency range).

In some examples, the signal-processing component 214 may perform integer down sampling, such as digital sampling, to remove certain samples from the audio signals. For example, the signal-processing component 214 may perform any form of digital down sampling or decimation to reduce the sampling rate of the audio signals, such as down sampling at a rate of 2 kHz (or another appropriate frequency). In this way, the signal-processing component 214 may produce an approximation or representation of the audio signals generated by the microphone(s) 112, but at a lower frequency rate. After down sampling the audio signals, the signal-processing component 214 may perform various signal processing, such as windowing, Fourier Transformations, and/or logarithmic transformations. For example, the signal-processing component 214 may perform various types of transforms to convert the audio signal from the time domain into the frequency domain, such as a Fourier transform, a fast Fourier transform, a Z transform, a Fourier series, a Hartley transform, and/or any other appropriate transform to represent or resolve audio signals into their magnitude (or amplitude) components and phase components in the frequency domain. Further, the signal-processing component 214 may utilize any type of windowing function on the audio data, such as the Hanning Window, the Hamming Window, Blackman window, etc. Additionally, the signal-processing component 214 may perform a logarithmic transform on the magnitude components to transform the magnitude components of the frequency of the reflected signal. For instance, due to the high-dynamic range of the magnitude components of the frequency of the reflected ultrasonic signal, and because the amount of reflection that occurs from movement of the user 106 is relatively small (may appear similar to noise), the logarithmic transform may transform the magnitude components into a larger range. After applying a logarithmic transform to the magnitude components, the change in magnitude caused by the reflection of the ultrasonic signal off of the moving object, or person, will be more easily identifiable.

In this way, the signal-processing component 214 may generate magnitude components and phase components that represent the frequency components (magnitude and phase) of the audio signals that represent reflected signals that correspond to the ultrasonic signal. Generally, the magnitude components and phase components may be complex numbers that represent the audio signals at each frequency. Thus, the magnitude components and phase components may represent frequency content for audio signals from each audio channel generated by the microphone(s) 112 after various digital processing has been performed on the audio signals by the signal-processing component 214. The magnitude components may be represented as logarithmic values (dB), and the phase components may be represented by radian and/or degree values. In this way, the signal-processing component 214 may generate magnitude components and phase components representing audio signals generated by two or more microphones in the microphone(s) 112 over a period of time (e.g., 8 seconds).

The computer-readable media 204 may further store a feature-extraction component 220 that, when executed by the processor(s) 202, cause the processor(s) to extract the magnitude feature data 216 and phase feature data 218 from the magnitude and phase components generated by the signal-processing component 214. The feature-extraction component 220 may perform various operations for normalizing and stacking features of the magnitude components and phase components for each audio channel from the microphone(s) 112. For example, the feature-extraction component 220 may receive the complex numbers (e.g., magnitude components and phase components) and remove the first order statistics. Further, the feature-extraction component 220 may perform feature stacking to stack the magnitude components across N time intervals to create magnitude feature data 216, and stack the phase components to create phase feature data 218.

In some examples, the feature-extraction component 220 may further perform normalization and remove background noise. For instance, the presence-detection device 104 may, at least periodically, activate one or more microphones 112 to generate audio signals representing background noise in an environment of the presence-detection device 104. The components of the presence-detection device 104 may analyze the background audio signal(s) representing the background noise, and the feature-extraction component 220 may further create background audio data which represents the background noise. Thus, once the feature-extraction component 220 has generated the magnitude feature data 216 and/or the phase feature data 218, the feature-extraction component 220 may utilize the background audio data to subtract, or otherwise remove, the representation of the background noise from the magnitude feature data 216 and/or the phase feature data 218. In this way, the feature-extraction component 220 may cause the background noise, such as a ceiling fan, a television, a refrigerator, etc., to not be represented in or by the magnitude feature data 216 and/or the phase feature data 218.

In some examples, the magnitude feature data 216 and the phase feature data 218 may generally represent binned frequency features over time, such as 1 dimensional binned frequency features over time that represent reflections of the ultrasonic signal. In various examples, the phase feature data 218 may comprise phase differences between multiple microphones, such as a phase difference between phase components of audio data generated at least in part by the respective microphones 112.

The computer-readable media 204 may further store a time-sequence classification component 222 configured to, when executed by the processor(s) 202, input the magnitude feature data 216 and the phase feature data 218 into one or more machine-learning model(s) 232 in order to classify the magnitude feature data 216 and/or phase feature data 218 as indicating movement of an object in the environment, a direction of the movement, and/or a number of objects moving in the environment. The machine-learning (ML) model(s) 232 may comprise any type of ML model(s) 232 (e.g., neural networks, linear regression, decision tree, Naïve Bayes, etc.) that may be trained to receive magnitude feature data 216 and phase feature data 218 as inputs, and determine outputs indicating whether the magnitude feature data 216 and phase feature data 218 represent movement of an object, a direction of that movement, and/or a number of objects moving.

A classification component 222 may further perform various techniques to train the ML model(s) 232. For instance, an ML model(s) 232, such as a neural network, may be trained with training data (e.g., magnitude feature data 216 and phase feature data 218) that is tagged as no movement, minor movement, and major movement, such as walking. Generally, the training data may comprise feature vectors of magnitudes of reflections of different ultrasonic signals off of objects over a period of time (e.g., windowing and feature stacking to represent the period of time). In this way, the ML model(s) 232 may be trained to identify input feature vector as representing reflections of ultrasonic signals that reflected off a moving object, or that did not reflect off a moving object.

Further, the ML model(s) 232 may additionally be trained to identify the direction of movement of the object through the environment. The microphone(s) 112 may include multiple microphones that generate, or otherwise are used to create, multi-channel feature data for frequency components of the reflection of the ultrasonic signal, such as phase components and phase feature data 218. The ML model(s) 232 may be trained using phase feature data 218 representing the phase components, or phase feature data 218 representing differences between the phase components, from multiple microphones 112. For instance, the ML model(s) 232 may be trained to identify, based on a comparison between phase components representing the reflection of the ultrasonic signal detected by two different microphones 206, a direction of the object as it moves through the environment.

In even further examples, the ML model(s) 232 may be trained to determine a number of people in the environment that are moving. As an example, the microphone(s) 112 in the presence-detection device 104 may include multiple microphones to generate, at least partly using various components of the presence-detection device 104, phase feature data 218, the model(s) 232 may identify, from the differences in phase components for audio signals generated by multiple microphones represented in the phase feature data 218, movement at various angles (in degrees or radians) that indicate multiple objects moving. For example, the phase feature data 218 may indicate that movement is detected at substantially 180 degrees from a defined axis of the array 112, and also at substantially 30 degrees from the defined axis. The ML model(s) 232 may be trained to determine that, if the difference in the angles are large enough, or over a threshold difference, multiple objects must be moving in the environment rather than one large object.

The computer-readable media 204 may further store a context component 224 configured to, when executed by the processor(s) 202, aggregate and communicate various contextual information between components. For example, the context component 224 may receive, and potentially further analyze, calibration data received from the calibration component 212, such as environment calibration data and/or device calibration data.

Further, the context component 224 may further receive classification results data from the classification component 222. For example, the classification component 222 and/or the ML model(s) 232 may analyze the magnitude feature data 216 and the phase feature data 218 and output confidence scores associated with one or more of (i) detecting movement of an object, (ii) detecting a direction of the movement, and (iii) detecting one or multiple objects moving in the environment of the presence-detection device 104. The context component 224 may be configured to determine if those confidence scores are above or below threshold values, and also determine actions for the presence-detection device 104 to perform based on the confidence scores being above or below threshold values. Generally, the threshold values may be associated with confidence values that indicate a high-degree, or sufficiently high-degree, of certainty that movement was detected, a direction of the movement, and/or that multiple objects were detected as moving. For instance, if the ML model(s) 232 outputs confidence scores that are higher than an 85% chance that movement was detected, the context component 224 may confirm or determine that movement was in fact detected and perform various operations. The confidence threshold values may be adjusted as desired, such as to err on various sides of detecting movement, or not detecting movement. For instance, the context component 224 may have fairly high threshold values in order to prevent the presence-detection device 104 from performing operations in instances where movement was incorrectly identified due to a lower threshold value.

The computer-readable media 204 may further store a sensitivity component 228 that is configured to transition between a low-sensitivity mode and a high-sensitivity mode (and/or other modes, such as anormal mode). In some instances, the sensitivity component 226 may simply place the presence-detection device 104 into one of the modes based on receiving user input that explicitly defines which mode the presence-detection device 104 is to be in for presence detection. In other instances, a default may be that the sensitivity component 226 places the presence-detection device 104 in a low-sensitivity mode until major movement is detected, and then transition the device 104 into a normal- or high-sensitivity mode. The device 104 may then process received signals to detect minor movement and/or both minor movement and major movement to track the presence of a user 106 in a room 102. After not detecting minor movement and/or major movement for a period of time, the sensitivity component 226 may transition the presence-detection device 104 may transition back into the low-sensitivity mode. Further description of the processing and transitioning techniques are described below.

The computer-readable media 204 may further store an audio-player component 228 configured to, when executed by the processor(s) 202, cause the processor(s) 202 to play audio such as music songs or other audio files. The audio-player component 228 may cause audio data to be provided to the loudspeaker(s) 110 to be converted into sound. In some examples, prior to providing the audio data to the loudspeaker(s) 110, the audio data may be stored in an audio-data buffer. In such examples, the signal-generation component 210 (or another component) may analyze the audio data stored in the audio-data buffer and determine how to mix the audio data, such as music data, with audio data representing the ultrasonic signal such that the output sound does not experience saturation.

The presence-detection device 104 may comprise any type of portable and/or fixed device and include one or more input devices 234 and output devices 236. The input devices 234 may include a keyboard, keypad, lights, mouse, touch screen, joystick, control buttons, etc. The output devices 236 may include a display, a light element (e.g., LED), a vibrator to create haptic sensations, or the like. In some implementations, one or more loudspeakers 110 may function as output devices 236 to output audio sounds.

The presence-detection device 104 may have one or more network interfaces 238 such as a wireless or Wi-Fi network communications interface, an Ethernet communications interface, a cellular network communications interface, a Bluetooth communications interface, etc., for communications over various types of networks, including wide-area network, local-area networks, private networks, public networks etc. In the case of a wireless communications interfaces, such interfaces may include radio transceivers and associated control circuits and logic for implementing appropriate communication protocols.

The network interface(s) 238 may enable communications between the presence-detection device 104 and the secondary devices 108, as well as other networked devices.

Such network interface(s) can include one or more network interface controllers (NICs) or other types of transceiver devices to send and receive communications over a network.

For instance, the network interface(s) 238 may include a personal area network (PAN) component to enable communications over one or more short-range wireless communication channels. For instance, the PAN component may enable communications compliant with at least one of the following standards IEEE 802.15.4 (ZigBee), IEEE 802.15.1 (Bluetooth), IEEE 802.11 (WiFi), or any other PAN communication protocol. Furthermore, each of the network interface(s) 238 may include a wide area network (WAN) component to enable communication over a wide area network. The networks may represent an array of wired networks, wireless networks, such as WiFi, or combinations thereof.

Figure 3:
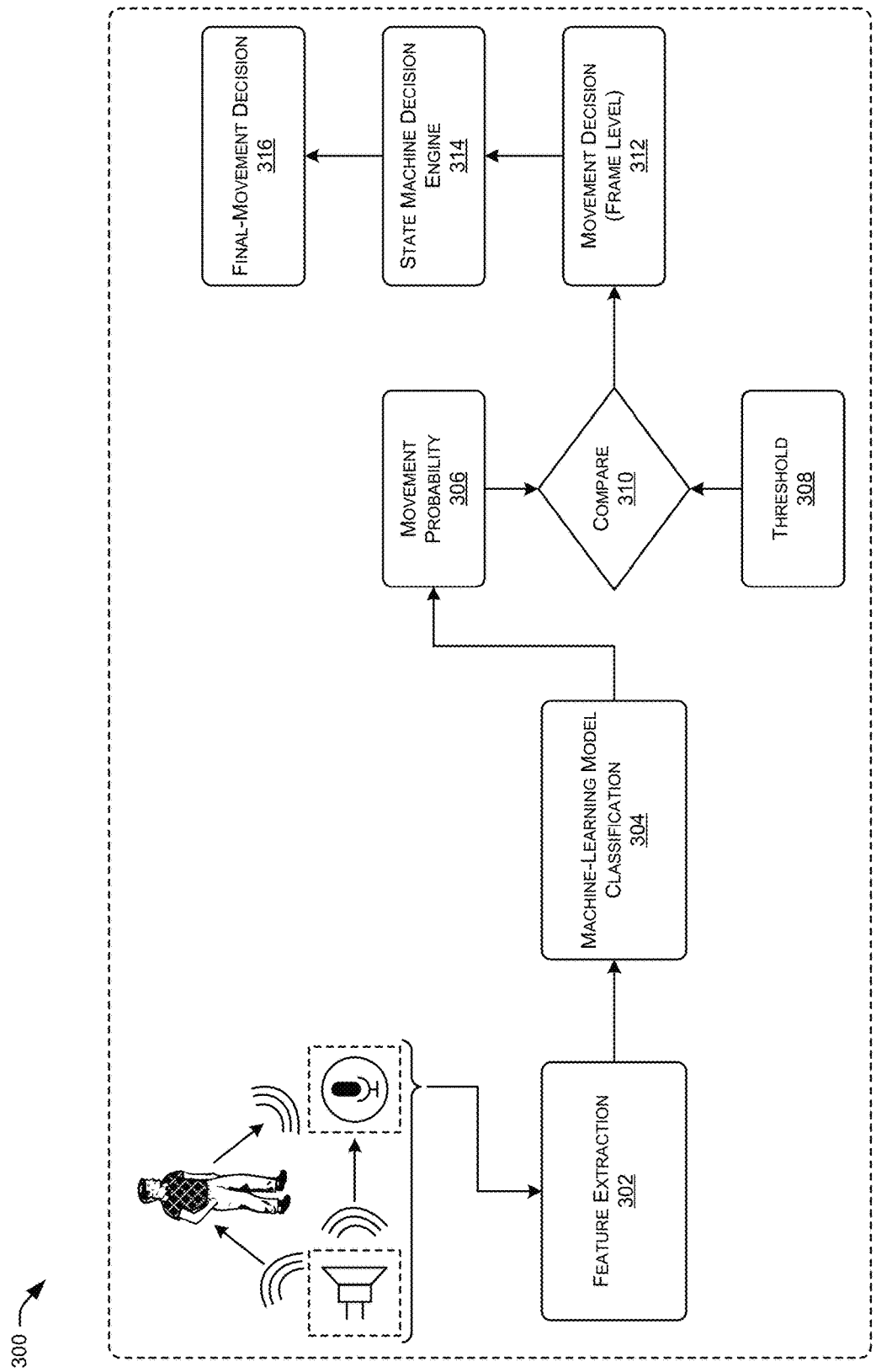
FIG. 3 illustrates an example high-level process for a presence-detection device to detect movement of a user in a normal sensitivity mode.

FIG. 3 illustrates an example high-level process for a presence-detection device 104 to detect movement of a user 106 in a normal sensitivity mode.

At 302, the feature-extraction component 220 may perform feature extraction to extract and or otherwise identify features from audio data generated by a microphone 112. For instance, the feature-extraction component 220 may extract the magnitude feature data 216 and phase feature data 218 from the magnitude and phase components generated by the signal-processing component 214. The feature-extraction component 220 may perform various operations for normalizing and stacking features of the magnitude components and phase components for each audio channel from the microphone(s) 112. For example, the feature-extraction component 220 may receive the complex numbers (e.g., magnitude components and phase components) and remove the first order statistics. Further, the feature-extraction component 220 may perform feature stacking to stack the magnitude components across N time intervals to create magnitude feature data 216, and stack the phase components to create phase feature data 218.

Figure 4:
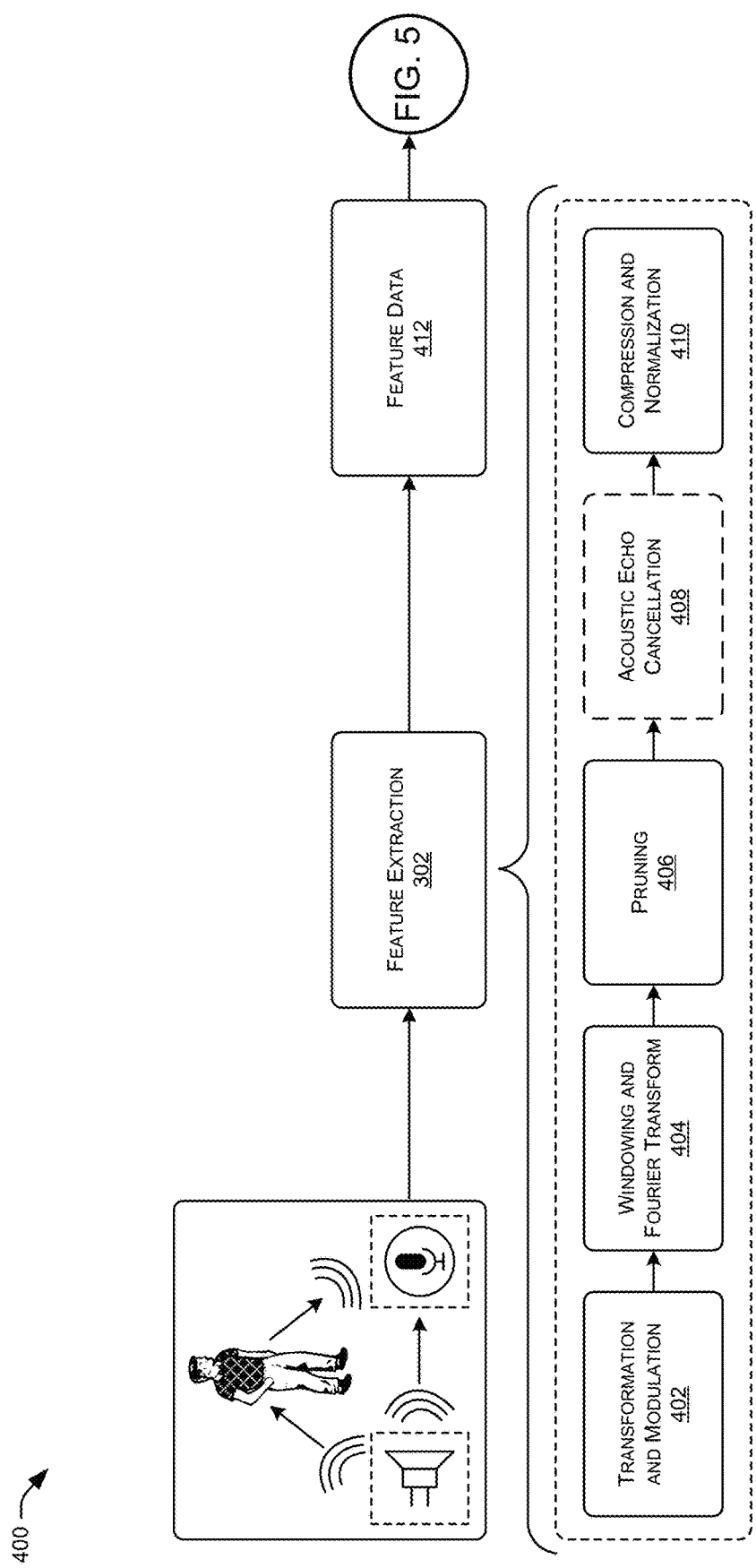
FIG. 4 illustrates an example high-level process for a presence-detection device to emit an ultrasonic signal into an environment, use a microphone to generate data representing reflections of the ultrasonic signal off an object, and extract feature data from the data in order to detect whether the object is moving.

As described in more detail in FIG. 4, the feature-extraction component 220 may extract the feature data using a Fourier transform that samples according to a frequency resolution based on the mode that the device 104 is in (e.g., high-sensitivity mode, low sensitivity mode, etc.).

At 304, the ML model(s) 232 may receive feature data as input and output a movement probability 306. For instance, the ML model(s) 232 may be trained to determine a likelihood that feature data input into the ML model(s) represent major movement, minor movement, and/or no movement. The ML model(s) 306 may then output a movement probability 306 that indicates, on a frame-by-frame basis, a likelihood that the feature data represents movement by an object in the environment 102.

At 310, the movement probability 306 may be compared to a threshold 308 value. The threshold 308 may be a value associated with a high confidence of movement such that if the movement probability is greater than or equal to the threshold, there is a high likelihood that movement is represented in the feature data. In some instances, the threshold 308 may simply be a pre-configured value that was determined in factory testing by a manufacturer of the presence-detection device 104 or system. In other examples, the threshold 308 may be a smart operating threshold that each individual device 104 learns during periods of time when no presence is detected. For instance, the presence-detection device 104 may determine that there is generally no motion at night, such as at midnight, and may generate a device-aware and environment-aware threshold that takes into account ambient noise or sound of the device 104 and environment 102. The new threshold may be lower than the default threshold and may help ensure no false alarms during previous no-presence time spans. Stated otherwise, the new operating threshold may take into account environment noise such that the presence-detection device 104 will not inappropriately trigger movement where there is no movement. In some instances, the smart threshold may be updated on a periodic basis, and may only used in the high-sensitivity mode to avoid unseen false alarm events.

In some instances, different thresholds 308 may be used based on the mode in which the presence-detection device 104 is operating. For instance, in the low-sensitivity mode, the presence-detection device 104 may utilize a higher threshold 308 such that false alarms are avoided. For instance, the low-sensitivity mode may be used for security systems that alert authorities if movement is detected, at it may be advantageous to have a higher threshold 308 to help ensure the confidence that a movement probability 306 is confirmed as indicating major movement.

In the high-sensitivity mode, the threshold 308 may utilize the environment-aware threshold 308 that is higher than the threshold used in the low-sensitivity mode, but that takes into account ambient noise or sound of the device 104 and environment 102 to help reduce false alarms (e.g., movements by curtains, movements by a fan, etc.). Thus, the threshold 308 used in the high-sensitivity mode may be used to track minor movements from a user 106, but also suppresses false alarms when a room is not occupied by taking into account ambient noise in the threshold 308.

Further, the different operating modes may utilize different state machine engines that analyze feature data on a frame-by-frame basis and can be used to increase and/or decrease the presence-detection sensitivity based on what mode the device 104 is in.

At 312, movement decisions may be output on a frame-by-frame level indicating, based on the comparing 310, if movement was detected in each frame. In some instances, a frame may correspond to feature data collected for a pre-defined a period of time (e.g., 50 ms, 100 ms, etc.) that is analyzed together by the ML model 232. The movement decisions for each frame may be input into a state machine decision engine 314 that determines, by analyzing the frames, a final-movement decision 316. The state machine decision engine 314 may use multiple frames to build up to a decision that movement is detected, or multiple frames to determine a final decision that movement is not detected. Additional description of the state machine decision engine 314 can be found at least in FIGS. 6A and 6B.

FIG. 4 illustrates an example high-level process 400 for a presence-detection device to emit an ultrasonic signal into an environment, use a microphone to generate data representing reflections of the ultrasonic signal off an object, and extract feature data from the data in order to detect whether the object is moving.

As illustrated, a microphone 112 may generate audio data representing reflection signals as well as direct path signals between the microphone and the loudspeaker, and the feature extraction process 302 may begin.

At 402, the signal-processing component 314 may perform transformation and modulation. For instance, the signal-processing component 314 may perform high-pass filtering on the audio data at to remove audio data in unwanted frequencies, baseband carrier shift at to modulate the audio signal back to baseband frequency from carrier frequency, perform low-pass filtering on the audio data at to remove audio data in unwanted frequencies, and perform down sampling on the audio data stream at to produce an approximation or representation of the audio signals generated by the microphone 112, but at a lower frequency rate.

At 404, the signal-processing component 314 may then perform windowing, fast Fourier transforms, and logarithmic transforms on the audio data to generate magnitude feature data 216 and phase feature data 218. As noted above, the frequency resolution, or sampling, performed during the Fourier transform may differ based on which sensitivity mode the device 104 is in. generally, the window size may be 256 and the hop size may be 128, but other values may be used at well as effectively. In some instances, a 2 kHz signal may be fed into the windowing and Fourier transform block 404, and the output from the windowing and Fourier transform block 404 may be bins (e.g., 128 bins) of feature data for each frame at approximately 1 kHz.

In an example of the low-sensitivity mode, a 96 kHz signal may be transformed and modulated to 2 kHz baseband signal at block 402 where the ultrasound carrier frequency is shifted to 500 Hz. At block 404, a 256-point FFT is applied with window size 256 and hop size 128.

At 406, the signal-processing component 314 may prune the feature data to cover ±258 Hz of the carrier frequency Generally, the pruning 406 may help remove bins, or portions of the feature data, that represent energy values for unwanted signals, such as the direct path signals between the loudspeaker a microphone.

In examples where the loudspeaker 110 is concurrently playing audio data (e.g, playing music) while performing ultrasound detection, the signal-processing component 314 may perform acoustic echo cancellation at 408. For instance, the signal-processing component 314 may obtain a reference signal that corresponds to the audible audio being output by the loudspeaker 110, and the reference signal may be generated using a same sampling rate as that of audio data generated using the microphone 112. The audio data and the reference signal may each be input into an AEC component, and the AEC component may perform various techniques to identify correlations between the audio data and the reference signal, and remove or filter the correlated portions from the audio data. Thus, an output of the AEC component may be the audio data that represents the reflected signals, but the audible signal representation may be removed and/or attenuated. That is, the AEC component may identify and remove distortions in the reflected signal caused by concurrent output of the audible sound. In some instances, the distortions caused by the audible sound may manifest themselves in the frequency range of the reflected signal and mirror the audible sound. Thus, the audible signal may mirror distortions caused by the audible sound in the reflected signal.

At 410, the signal-processing component 214 may compress and normalize the resulting data to generate the feature data 412. For instance, the feature-extraction component 220 may perform feature stacking using the magnitude feature data 216 and/or phase feature data 218 to generate binned audio feature data over time. For example, the magnitude feature data 216 may comprise a 1-dimensional vector, and the phase differences between phase components be also be a 1-dimensional array representing audio data streams over a period of time that represent the ultrasonic signal reflected off objects in the environment.

Figure 5:
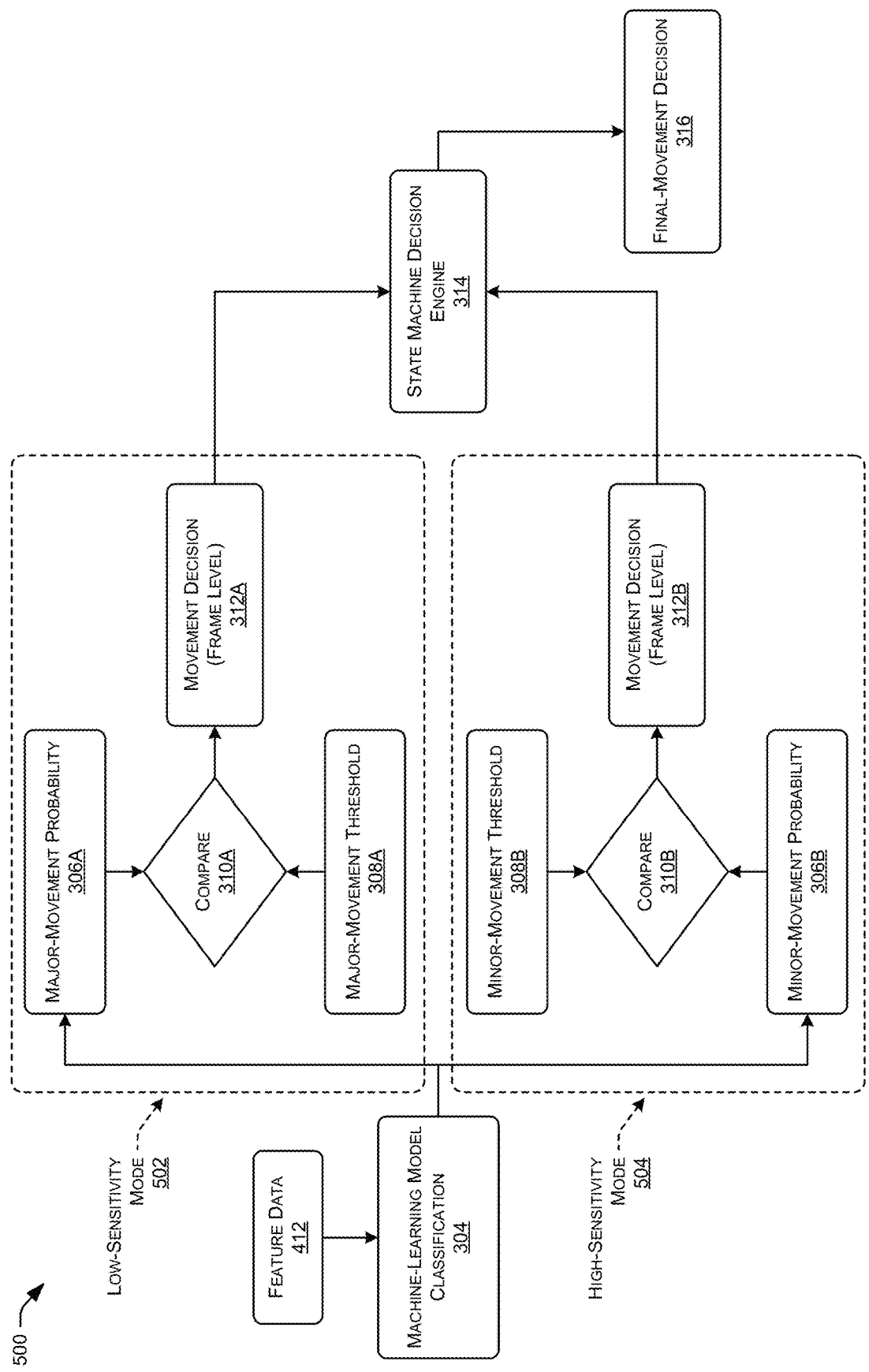
FIG. 5 illustrates an example high-level process for a machine-learning model to analyze feature data in one or both of a low-sensitivity mode and/or a high-sensitivity mode to detect movement of an object in an environment.

FIG. 5 illustrates an example high-level process for a machine-learning model 232 to analyze feature data in at least one of a lower-sensitivity mode or a higher-sensitivity mode to detect movement of an object in an environment.

As shown, feature data 412 may be input into the machine-learning model classification step 304 that classifies the feature data as representing minor movements, major movements, or no movements (depending on what sensitivity mode the device 104 is in). In some instances, the ML model(s) 232 may be trained to provide one or more outputs indicating probabilities that the feature data represents major movements or minor movements. As illustrated, the machine-learning model classification step 304 may receive feature data 412, and ML model(s) 232 may output a major-movement probability 306A and a minor-movement probability 306B indicating likelihoods, or confidence values, that the feature data represents a major movement or a minor movement. In some instances, the ML model(s) 232 may output the major-movement probability 306A while in the lower-sensitivity mode 502 (e.g., analyzing feature data sampled at a lower frequency resolution of a Fourier transform). Similarly, the ML model(s) 232 may output the minor-movement probability 306B while in a higher-sensitivity mode (e.g., analyzing feature data sampled at a higher frequency resolution of a Fourier transform). In even further examples, the ML model(s) 232 may be able to output major-movement probabilities 306A and minor-movement probabilities 306B as dual outputs in a hybrid operating mode.

In the low-sensitivity mode 502, the major-movement probability 306A may be compared at 310A with a major-movement threshold 308A to determine whether the probability 306A indicates major movement. For instance, the major-movement threshold 308A may be 0.85, and any probabilities at or above 0.85 may be classified as major movement, but probabilities lower than 0.85 may be classified as not major movement. After comparing at 310A, a movement decision 312A may be made on a frame-by-frame level.

In the higher-sensitivity mode 504, the minor-movement probability 306B may be compared at 310B with a minor-movement threshold 308B to determine whether the probability 306B indicates minor movement. For instance, the minor-movement threshold 308B may be 0.85, and any probabilities at or above 0.85 may be classified as minor movement, but probabilities lower than 0.85 may be classified as not minor movement. After comparing at 310B, a movement decision 312B may be made on a frame-by-frame level.

In some instances, different thresholds 308 may be used based on the mode in which the presence-detection device 104 is operating. For instance, in the low-sensitivity mode 502, the presence-detection device 104 may utilize a higher threshold 308 such that false alarms are avoided. For instance, the low-sensitivity mode 502 may be used for security systems that alert authorities if movement is detected, at it may be advantageous to have a higher threshold 308 to help ensure the confidence that a movement probability 306 is confirmed as indicating major movement.

In the high-sensitivity mode 504, the threshold 308 may utilize the environment-aware threshold 308 that is higher than the threshold used in the low-sensitivity mode 502, but that takes into account ambient noise or sound of the device 104 and environment 102 to help reduce false alarms (e.g., movements by curtains, movements by a fan, etc.). Thus, the threshold 308 used in the high-sensitivity mode may be used to track minor movements from a user 106, but also suppresses false alarms when a room is not occupied by taking into account ambient noise in the threshold 308.

The state machine decision engine 314 may receive the movement decisions 312A and 312B, depending on the sensitivity mode, and make a final-movement decision 316 based on an analysis of one or more frames. Discussion of the state machine decision engine 314 is found below with respect to FIGS. 6A and 6B.

In some instances, the movement decisions 312A and 312B may be a single decision indicating movement (e.g., a "1") or non-movement (e.g., a "0") regardless of whether major movement or minor movement was detected. The state machine decision engine 314 may different based on what mode the presence-detection device 104 is in.

Figure 6A:
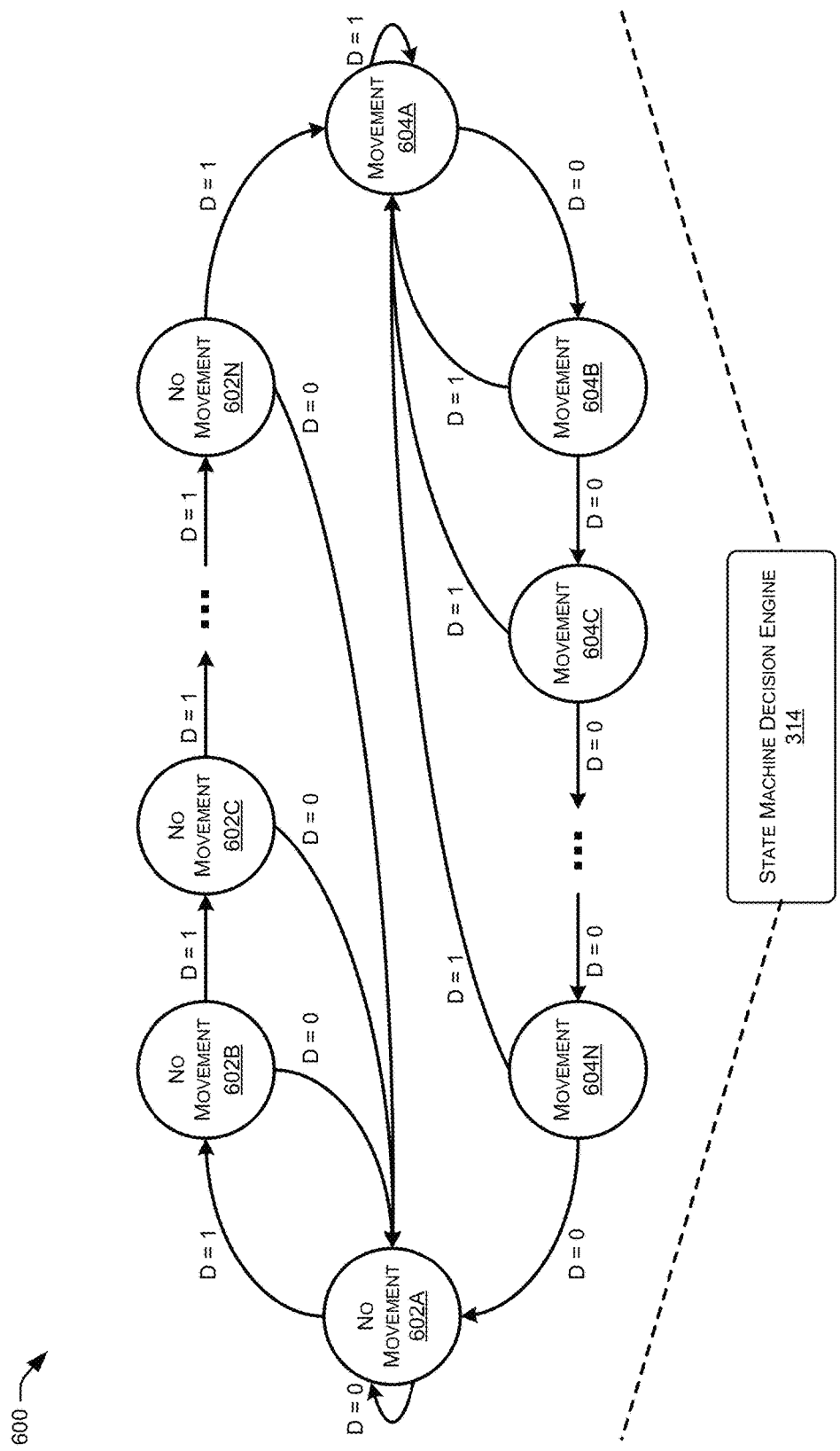
FIG. 6A illustrates an example of a state machine decision engine that connects frame-level decisions indicating whether or not movement or non-movement has been detected.

FIG. 6A illustrates an example 600 of a state machine decision engine 314 that connects frame-level decisions indicating whether or not movement or non-movement has been detected. In some instances, the example 600 of the state machine decision engine 314 may be used in the normal-sensitivity mode and/or in the low-sensitivity mode. As shown, the example 600 of the state machine decision engine 314 generally favors a decision to stay in the no movement state 602 because if a single frame indicates no movement, then the state of the engine 314 reverts back to no movement 602. Thus, in the example 600, it takes multiple, consecutive frames of movement decisions to ultimately move to a movement state 604. In this way, the system errs a bit more on the side of staying in the no movement state 602, or alternatively staying in the movement state 604, to help remove false positives of transitioning between states.

As illustrated, the state machine decision engine 314 may be in a no movement state 602A where the classification component 222 has determined that there has not been movement detected in the environment. The state machine decision engine 314 may continue to receive decisions "D" where each decision "D" indicates a "0" for non-movement and a "1" for movement on a frame level. As shown, when D is a "0," the state machine decision engine 314 may remain in the no movement state 602A. However, the state machine decision engine 314 may begin receiving decisions where D is "1," and the state machine decision engine 314 may progress through no movement stages 602 until a threshold number of "1" decisions are received. In some instances, the threshold may simply be two decisions of "1," but in other examples the number of decisions D that must be "1" may be higher than 2.

In some instances, at each stage where the state machine decision engine 314 is still in a no movement state 602, if the state machine decision engine 314 receives a decision D of "1," then the state machine decision engine 314 may move back to no movement state 602A. in this way, multiple frames in a row must be determined to indicate movement in order to transition from no movement 602 into a movement state 604A. In this way, it may take multiple frames of movement decisions being positive in order to make a final decision of movement 604 to reduce false positives. Similarly, it may take multiple frames of non-movement decisions in a row to transition from movement 604 back into a no movement state 602.

Figure 6B:
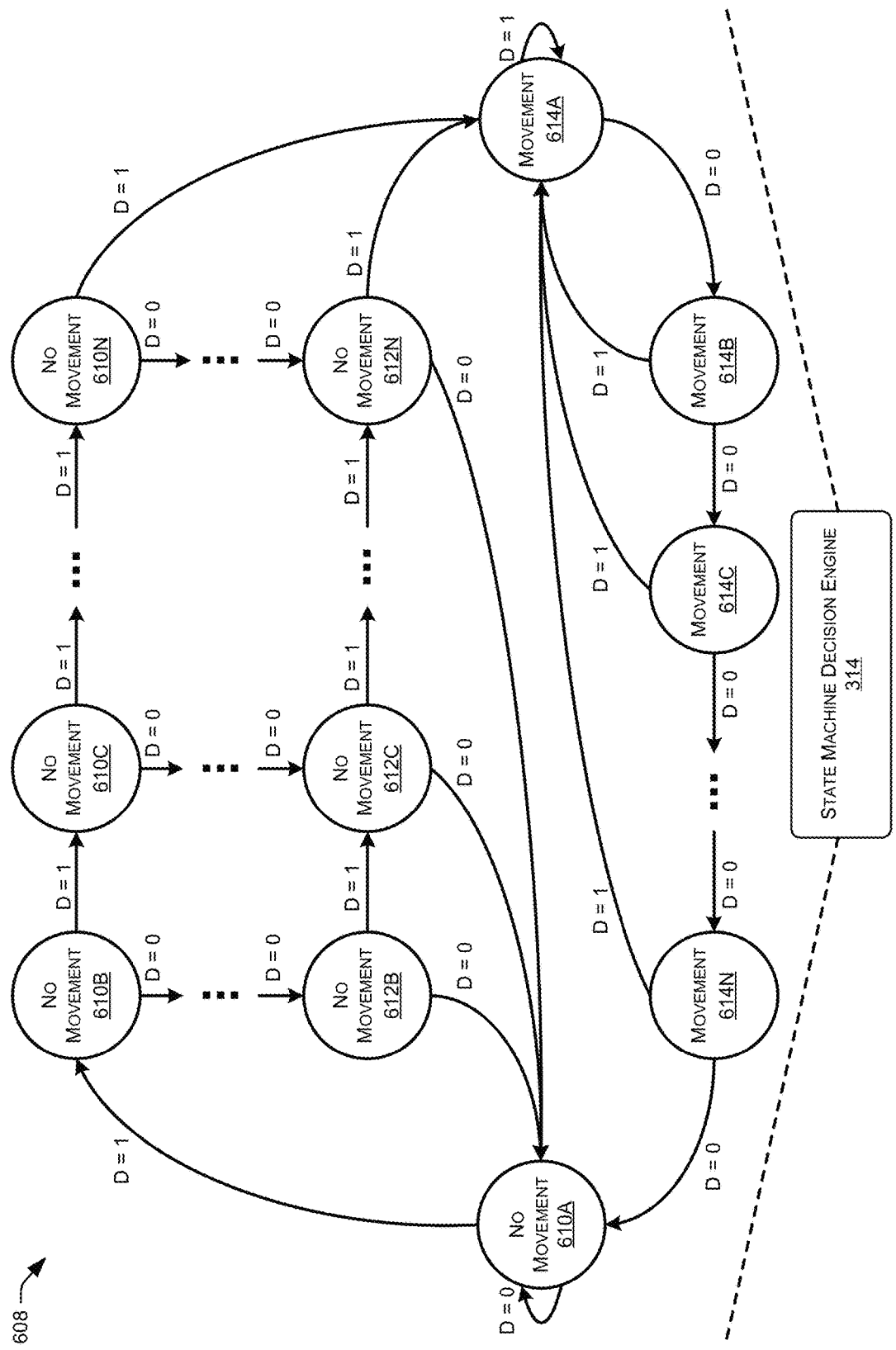
FIG. 6B illustrates another example of a state machine decision engine that connects frame-level decisions accordingly to a tolerance level to indicate whether or not movement or non-movement has been detected.

FIG. 6B illustrates another example of a state machine decision engine 314 that connects frame-level decisions accordingly to a tolerance level to indicate whether or not movement or non-movement has been detected.

In some instances, the state machine decision engine 314 of FIG. 6B may be utilized in the high-sensitivity mode to favor the transition to the movement state 614. Similarly, the counter may be increased in the high-sensitivity mode to prevent the presence-detection device 104 from switching back to the no movement state 610. The state machine decision engine 314 may include a tolerance factor that helps the transition to the movement state 614 where, even if a no movement decision is received, the state of the state machine decision engine 314 can continue moving towards movement 614 over time as long as movement decisions are received for subsequent frames. Thus, the state machine decision engine 314 can be varied and tweaked to favor moving towards movement states 614 or no movement states 610 depending on what is favorable for the user 106 and/or use case with the device 104. For instance, it may be favorable to move towards no movement states 610 for security systems to ensure that false alarms are not triggered (e.g., high consequence results).

Figure 7:
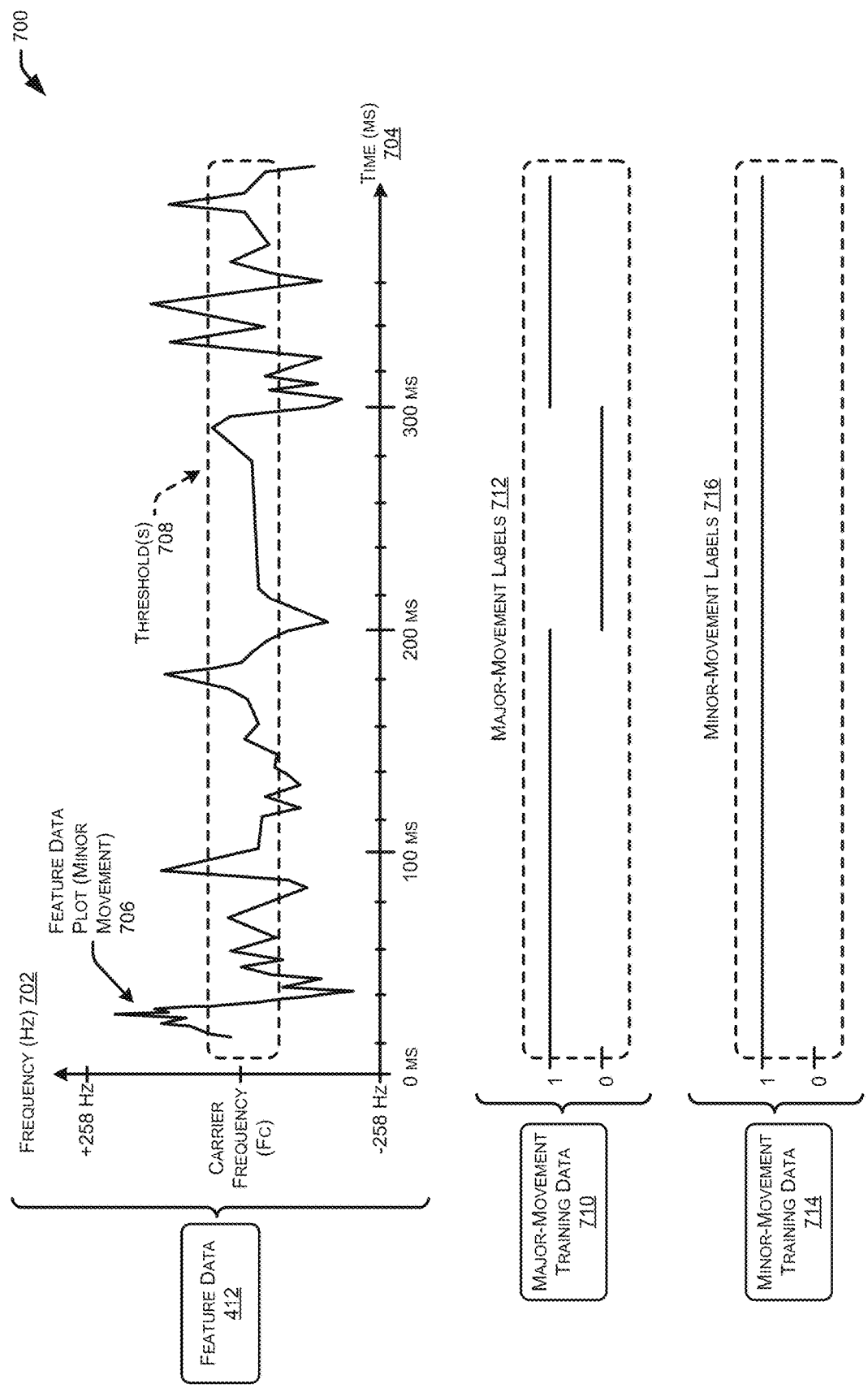
FIG. 7 illustrates an example diagram illustrating feature data that is used to create major-movement training labels and minor-movement training labels to train one or more classifiers to detect major and minor movement.

FIG. 7 illustrates an example diagram illustrating feature data 412 that is used to create major-movement training labels and minor-movement training labels to train one or more classifiers to detect major and minor movement.

The feature data 412 is illustrated on a plot where the frequency 702 is on the y axis versus the time 704 on the x axis. The feature data plot 706 represents Doppler shifts causes by minor movements in an environment for a period of time, and the feature data plot 706 is shown with respect to one or more thresholds 708 that indicate the line between minor movements and major movements. Generally, when the feature data plot 706 moves beyond the threshold(s) 708, the feature data 412 may represent major movements (as well as minor movements), and when the feature data plot 706 is within the threshold(s) 708, the feature data 412 may represent minor movements.

The feature data 412 is used to create major-movement training data 710 using major-movement training labels 712, and minor-movement training data 714 using minor-movement training labels 716. When there is no movement represented in the feature data 412, both major- and minor-movement training labels 712/716 are set to "0." For major movement recordings, both major and minor movement labels 712/716 are set to "1" for consistency. For minor movement recordings, the major movement label 712 is generated by a teacher model (e.g., teacher neural network) trained on major movement data. The minor movement label 716 may be generated by computer vision assisted labeling, which is further corrected using major movement labels 712 (e.g., if major movement label=1, minor movement label should also be set to 1). Generally, no contradicting gradient will be generated with this labeling technique. Further, during run-time inference, the minor movement output is consumed only when the high-sensitivity mode is active, and it is not used in other sensitivity modes to reduce false alarms.

Generally, the feature data 412 may include representations of the Doppler shift and/or energy values for the Doppler shifts. Generally, the amount of shift caused by the Doppler shift, and the energy values for the Doppler shifts, can be used to classify movement as being minor, major, or no movement. The greater the shift in the frequency, the more likely the Doppler shift represents major movement (e.g., higher speed movements such as walking), and the less of a shift indicates minor movement (e.g., lower speed movements such as flipping a page of a book). Similarly, the greater the energy values for the Doppler shifts, the more likely the feature data 412 represents major movement (e.g., large objects moving, such as a user walking), and the smaller the energy values for the Doppler shifts, the more likely the feature data 412 represents minor movements (e.g., small objects such as hands or fingers moving) or no movements. The training data 710/714 and the labeled feature data 412 may be used to train the ML models 232 to receive input feature data and classify that feature data, on a frame-by-frame basis, as representing major movements, minor movements, or no movements.

Figure 9:
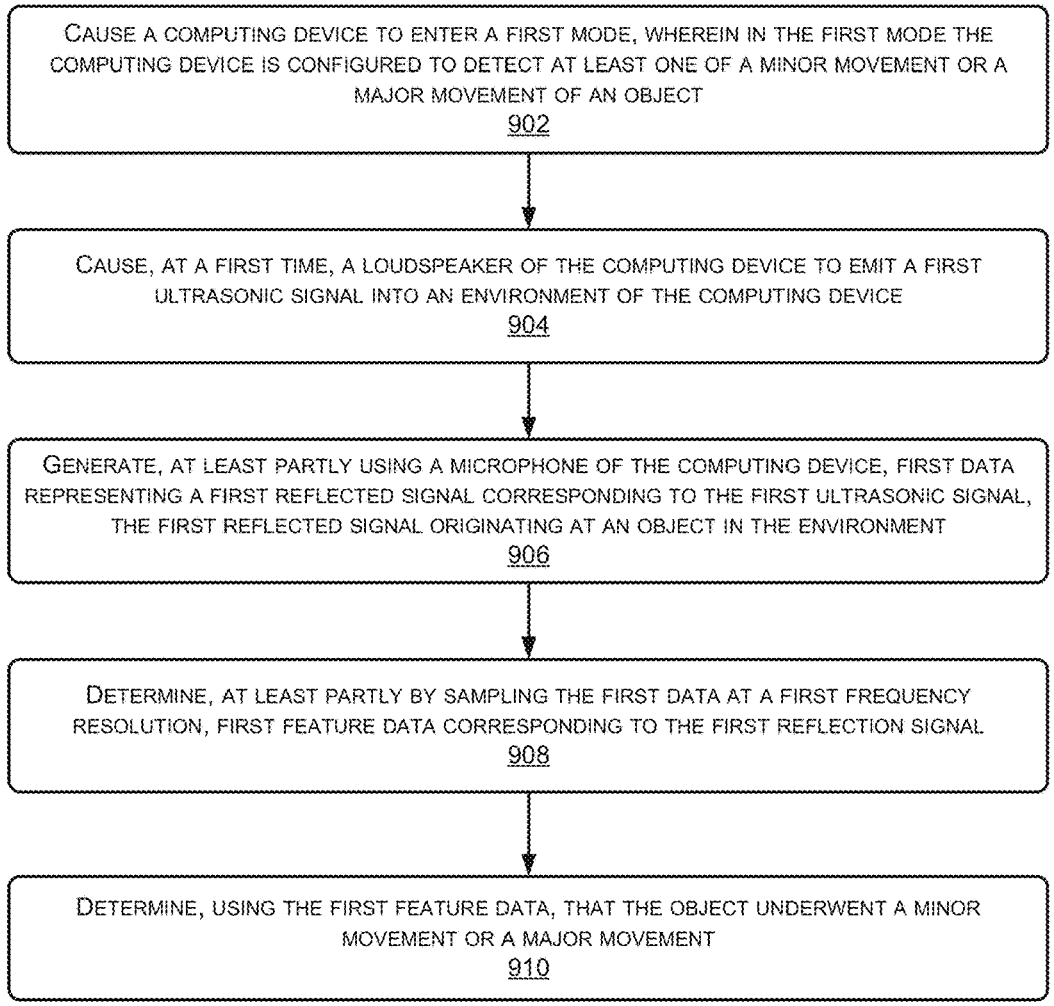
FIG. 9 illustrates a flow diagram of an example process for using ultrasonic signals to detect at least one of a major movement or a minor movement of a user in an environment.
Figure 10:
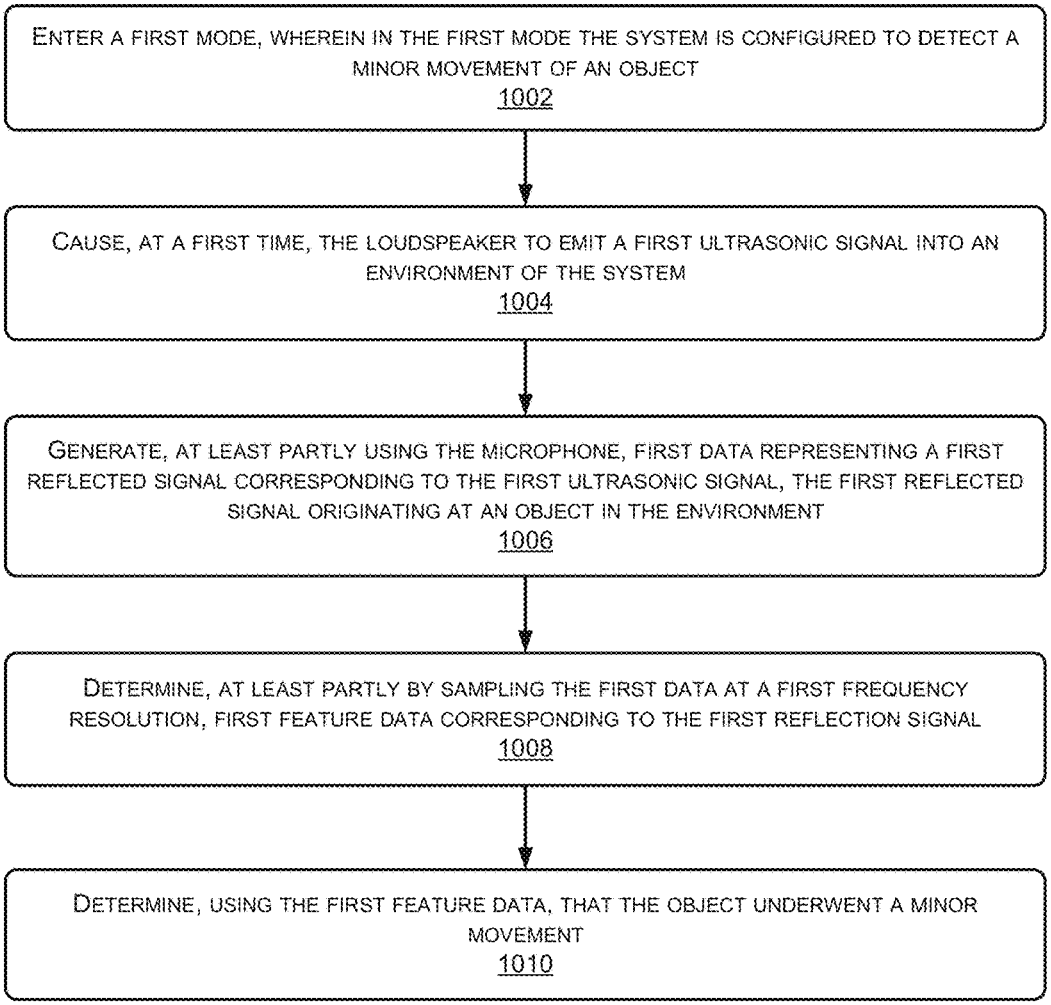
FIG. 10 illustrates a flow diagram of an example process for using ultrasonic signals to detect a minor movement of a user in an environment.

FIGS. 8-10 illustrate flow diagrams of example processes/methods 800, 900, and 1000. These processes (as well as each process or method described herein,) is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

FIG. 8 illustrates a flow diagram of an example process 800 for using ultrasonic signals to detect a minor movement of a user in an environment.

At 802, the presence-detection device 104 may enter a first sensitivity mode, wherein in the first sensitivity mode the presence-detection device 104 is configured to detect one or more minor movements of one or more objects. For instance, the presence-detection device 104 may enter a low-sensitivity mode, a high-sensitivity mode, a normal-sensitivity mode, and/or an automated-sensitivity mode during which the presence-detection device 104 is configured to detect one or more of major movements, minor movements, and/or no movement.

At 804, the presence-detection device 104 may cause, at a first time, the loudspeaker to emit a first ultrasonic signal into an environment of the presence-detection device. For instance, the presence-detection device 104 may cause the loudspeaker 110 to emit ultrasonic sound 114 into the room 102 in which the device 104 is positioned.

At 806, the presence-detection device 104 may generate, at least partly using the microphone, first data representing a first reflected signal corresponding to the first ultrasonic signal where the first reflected signal originating at an object in the environment. For instance, the presence-detection device 104 may use a microphone 112 to generate audio data representing a reflected sound 112 signal off a user 106 in the room 102.

At 808, the presence-detection device 104 may determine, at least partly using a Fourier transform algorithm that samples the first data at a first frequency resolution, first feature data corresponding to the first reflection signal. Generally, the frequency resolution may be selected and used for sampling based on what mode the device is in. For instance, a one sampling frequency may be used in the high-sensitivity mode that is greater than a sampling frequency used in the low-sensitivity mode. The feature data may represent at least energy values for frequency changes caused by the Doppler shift.

At 810, the presence-detection device 104 may determine, using the first feature data, a first value indicating a first likelihood that the first feature data represents one or more minor movement. For instance, the feature data may be input into an ML model 232 configured to output a movement probability value 306 indicating a likelihood that the feature data represents one or more minor movements.

At 812, the presence-detection device 104 may determine that the first value is greater than or equal to a threshold value associated with detection of one or more minor movements. For instance, the presence-detection device 104 may compare the movement probability with a threshold 308 that is used for confidently detecting minor movements. The threshold 308 may vary based on what sensitivity mode the device 104 is in.

At 814, the presence-detection device 104 may determine that the object made or underwent a minor movement based at least in part on the first value being greater than or equal to the threshold value. In some instances, multiple movement decisions 312 may be used for multiple frames to determine (e.g., using the state machine decision engine 314) a final-movement decision 316 of minor movement.

FIG. 9 illustrates a flow diagram of an example process 900 for using ultrasonic signals to detect at least one of a major movement or a minor movement of a user 106 in an environment.

At 902, the presence-detection device 104 may enter a first mode, wherein in the first mode the computing device is configured to detect at least one of a minor movement or a major movement of an object. For instance, the presence-detection device 104 may enter a low-sensitivity mode, a high-sensitivity mode, a normal-sensitivity mode, and/or an automated-sensitivity mode during which the presence-detection device 104 is configured to detect one or more of major movements, minor movements, and/or no movement.

At 904, the presence-detection device 104 may cause, at a first time, a loudspeaker of the computing device to emit a first ultrasonic signal into an environment of the computing device. For instance, the presence-detection device 104 may cause the loudspeaker 110 to emit ultrasonic sound 114 into the room 102 in which the device 104 is positioned.

At 906, the presence-detection device 104 generate, at least partly using a microphone of the computing device, first data representing a first reflected signal corresponding to the first ultrasonic signal, the first reflected signal originating at an object in the environment. For instance, the presence-detection device 104 may use a microphone 112 to generate audio data representing a reflected sound 112 signal off a user 106 in the room 102.

At 908, the presence-detection device 104 determine, at least partly by sampling the first data at a first frequency resolution, first feature data corresponding to the first reflection signal. Generally, the frequency resolution may be selected and used for sampling based on what mode the device is in. For instance, a one sampling frequency may be used in the high-sensitivity mode that is greater than a sampling frequency used in the low-sensitivity mode. The feature data may represent at least energy values for frequency changes caused by the Doppler shift.

At 910, the presence-detection device 104 determine, using the first feature data, that the object made or underwent (e.g., voluntarily or involuntarily) a minor movement or a major movement. For instance, the first feature data may be input into an ML model 232 configured to determine that the object made at least one of a minor movement and/or a major movement.

FIG. 10 illustrates a flow diagram of an example process 1000 for using ultrasonic signals to detect a minor movement of a user in an environment.

At 1002, the presence-detection device 104 may enter a first mode, wherein in the first mode the computing device is configured to detect a minor movement of an object. For instance, the presence-detection device 104 may enter a a high-sensitivity mode, a normal-sensitivity mode, and/or an automated-sensitivity mode during which the presence-detection device 104 is configured to detect minor movements and/or no movement.

At 1004, the presence-detection device 104 may cause, at a first time, a loudspeaker of the computing device to emit a first ultrasonic signal into an environment of the computing device. For instance, the presence-detection device 104 may cause the loudspeaker 110 to emit ultrasonic sound 114 into the room 102 in which the device 104 is positioned.

At 1006, the presence-detection device 104 generate, at least partly using a microphone of the computing device, first data representing a first reflected signal corresponding to the first ultrasonic signal, the first reflected signal originating at an object in the environment. For instance, the presence-detection device 104 may use a microphone 112 to generate audio data representing a reflected sound 112 signal off a user 106 in the room 102.

At 1008, the presence-detection device 104 determine, at least partly by sampling the first data at a first frequency resolution, first feature data corresponding to the first reflection signal. Generally, the frequency resolution may be selected and used for sampling based on what mode the device is in. For instance, a one sampling frequency may be used in the high-sensitivity mode that is greater than a sampling frequency used in the low-sensitivity mode. The feature data may represent at least energy values for frequency changes caused by the Doppler shift.

At 1010, the presence-detection device 104 determine, using the first feature data, that the object made or underwent a minor movement. For instance, the first feature data may be input into an ML model 232 configured to determine that the object made or underwent a minor movement.

Figure 11:
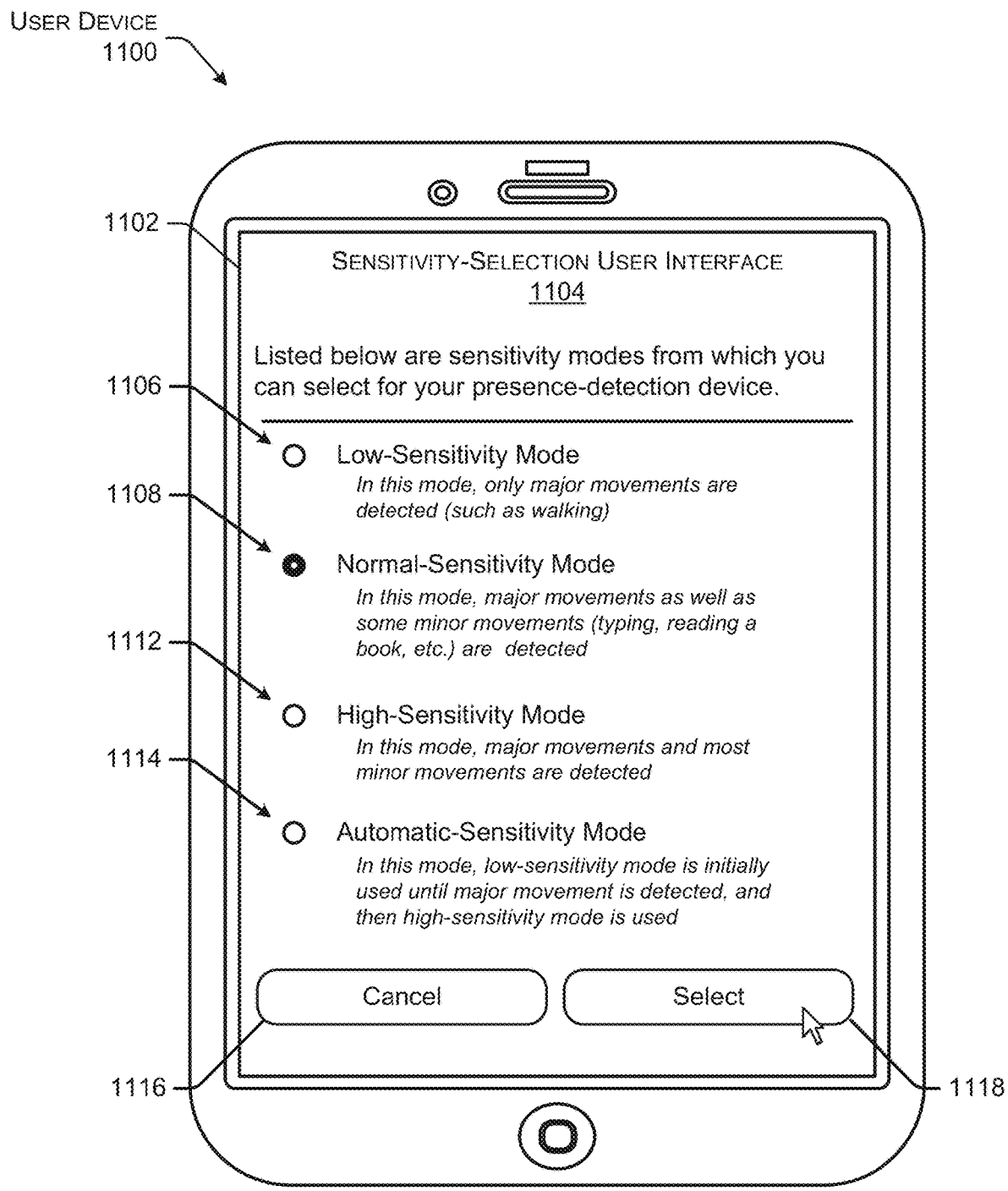
FIG. 11 illustrates an example user device that has a display for presenting a sensitivity-selection user interface (UI) through which a user can interact and select a sensitivity mode for a presence-detection device.

FIG. 11 illustrates an example user device 1100 that has a display 1102 for presenting a sensitivity-selection user interface (UI) 1104 through which a user 106 can interact and select a sensitivity mode for a presence-detection device. The user device 110 can comprise any type of computing device, such as a phone, tablet, personal computer, wearable device, and so forth. The user device 1100 includes a display 1102 that presents one or more sensitivity-selection UIs 1104. The user device 1100 may execute an application associated with, or that communicates with, the presence-detection device 104 in order to place the presence-detection device 104 into various sensitivity modes.

As shown, the sensitivity-selection UI 1104 may present various options with which the user 106 can interact to select a sensitivity mode. For instance, the sensitivity-selection UI 1104 may include a low-sensitivity mode option 1106 for a mode in which major movements are detected, a normal-sensitivity mode option 1108 for a mode in which major movements as well as some minor movements are detected, a high-sensitivity mode option 1112 for a mode in which major movements and most minor movements are detected, and an automatic-sensitivity mode option 1114 for a mode in which low-sensitivity is initially used until a major movement is detected, and then high-sensitivity mode is used to continue to detect movement until movement is not detected for a threshold period of time.

In some instances, when the automatic-sensitivity mode option 1114 is selected, the presence-detection device 104 may enter into the normal-sensitivity mode, rather than the low-sensitivity mode, until at least one of major movement or minor movement is detected. Generally, when the presence-detection device 104 detects movement, whether it is minor or major, the device 104 may transition into the high-sensitivity mode. While in the high-sensitivity mode, the device 104 may set a timer indicating a threshold period of time during which the device 104 stays in the high-sensitivity mode to detect major and minor movements. If the device 104 detects major and/or minor movement in the high-sensitivity mode, the presence-detection device 104 may reset the time and the presence-detection device 104 may stay in the high-sensitivity mode for a threshold period of time. The timer may be set for different times (e.g., 1 minute, 5 minutes, 15 minutes, etc.) such that, upon expiration of the timer, the presence-detection device 104 may transition back into the low-sensitivity mode at 116B. However, if minor movement and/or major movement is detected by the presence-detection device 104 within the threshold period of time set by the timer, then the timer may be reset and the presence-detection device 104 may stay in the high-sensitivity mode until the timer expires, or until movement is detected and the timer is reset. In this way, the presence-detection device 104 may err on the side of staying in the higher-sensitivity mode by resetting the timer, which reduces false alarms (e.g., turning off the lights when a user is in the room, but not moving as frequently).

Further, although the techniques of the automatic mode are described with respect to moving or transitioning between the low-sensitivity mode and the high-sensitivity mode, the techniques are equally applicable for moving between the normal-sensitivity mode and the high-sensitivity mode. That is, the presence-detection device 104 may be in the normal-sensitivity mode when movement has not been detected for a threshold period of time, and the presence-detection device 104 may be detecting major movements and some minor movements in the normal-sensitivity mode. Once a movement is detected, either major or minor, the presence-detection device 104 may transition into the high-sensitivity mode to more accurately detect minor movements. Thus, the techniques are equally applicable for high-sensitivity modes as well as normal-sensitivity modes.

The user device 1100 may receive user input at a cancel option 116 indicating a request to cancel the selection, or user input at a select option 118 to select a sensitivity mode for the presence-detection device 104. In this way, a user 106 can select a presence-detection sensitivity mode for their presence-detection device 104 to accommodate their environments and/or lifestyles. The input data may then be provided to the presence-detection device 104 to place the device in a desired or selected sensitivity mode.

As used herein, a processor, such as processor(s) 202 may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 202 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 202 may possess its own local memory, which also may store program components, program data, and/or one or more operating systems.

As described herein, computer-readable media and/or memory 204 may include volatile and nonvolatile memory, removable and non-removable media implemented in any method or technology for storage of information, such as computer-readable instructions, data structures, program component, or other data. Such computer-readable media and/or memory 304 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media may be implemented as computer-readable storage media ("CRSM"), which may be any available physical media accessible by the processor(s) 202 to execute instructions stored on the computer-readable media and/or memory 204. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as computer-readable media and/or memory 204, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

The network interface(s) 238 may enable communications between the presence-detection device 104 and other networked devices. Such network interface(s) 238 can include one or more network interface controllers (NICs) or other types of transceiver devices to send and receive communications over a network.

For instance, the network interface(s) 238 may include a personal area network (PAN) component to enable communications over one or more short-range wireless communication channels. For instance, the PAN component may enable communications compliant with at least one of the following standards IEEE 802.15.4 (ZigBee), IEEE 802.15.1 (Bluetooth), IEEE 802.11 (WiFi), or any other PAN communication protocol. Furthermore, the network interface(s) 238 may include a wide area network (WAN) component to enable communication over a wide area network. The networks that the presence-detection device 104 may communicate over may represent an array of wired networks, wireless networks, such as WiFi, or combinations thereof.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
causing a computing device to enter a first mode, wherein in the first mode the computing device is configured to detect a first type of movement, the first type of movement being one of a minor movement or a major movement of an object;
causing, at a first time, a loudspeaker of the computing device to emit a first ultrasonic signal into an environment of the computing device;
generating, at least partly using a microphone of the computing device, first data representing a first reflected signal corresponding to the first ultrasonic signal, the first reflected signal originating at an object in the environment;
determining, at least partly by sampling the first data at a first frequency resolution, first feature data corresponding to the first reflection signal;
determining, using the first feature data, that the object underwent the first type of movement;
causing the computing device to enter a second mode, wherein in the second mode the computing device is configured to detect a second type of movement that is different than the first type of movement;
causing, at a second time, the loudspeaker to emit a second ultrasonic signal;
generating, at least partly using the microphone, second data representing a second reflected signal corresponding to the second ultrasonic signal;
determining, at least partly by sampling the second data at a second frequency resolution that is different than the first frequency resolution, second feature data corresponding to the second reflection signal; and
determining, using the second feature data, whether the object underwent the second type of movement.

2. The method of claim 1, wherein:
the first mode comprises a low-sensitivity mode in which the computing device is configured to detect major movements and not minor movements;
the computing device enters the second mode prior to the computing device entering the first mode, wherein the second mode comprises a high-sensitivity mode in which the computing device is configured to detect minor movements; and
determining whether the object underwent the second type of movement includes determining, using the second feature data, that the object has not moved for at least a threshold period of time.

3. The method of claim 1, wherein:
the first mode comprises a high-sensitivity mode in which the computing device is configured to detect minor movements; and
determining that the object underwent the first type of movement includes:

analyzing multiple portions of the first feature data, individual ones of the multiple portions representing different time periods;

determining that a first number of the multiple portions of the first feature data indicate that the object underwent a minor movement;

determining that a second number of the multiple portions of the first feature data indicate no movement associated with the object, wherein the first number is greater than the second number.

4. The method of claim 1, wherein:

the first mode comprises a low-sensitivity mode in which the computing device is configured to detect major movements; and determining that the object underwent the first type of movement includes determining that the object made the major movement by:

analyzing multiple consecutive portions of the first feature data, individual ones of the multiple consecutive portions representing different time periods; and determining that the multiple consecutive portions of the first feature data each indicate that the object made a major movement.

5. The method of claim 1, further comprising, prior to causing the computing device to enter the first mode:

presenting a user interface on a display of a user device associated with the computing device, the user interface including:

a first option associated with the first mode in which the computing device is configured to detect one of major movements or minor movements; and a second option associated with a second mode in which the computing device is configured to detect another one of the major movements or the minor movements; and receiving user input indicating a selection of the first option associated with the first mode.

6. The method of claim 1, wherein:

the first mode comprises a high-sensitivity mode in which the computing device is configured to detect minor movements;

the computing device enters the second mode prior to the computing device entering the first mode, wherein the second mode comprises a low-sensitivity mode in which the computing device is configured to detect major movements;

determining whether the object underwent the second type of movement includes determining, using the second feature data, that the object made a major movement.

7. The method of claim 1, wherein:

in the first mode the computing device is configured to detect major movements;

the computing device enters into the second mode for a threshold period of time, the second mode comprising a high-sensitivity mode in which the computing device is configured to detect minor movements and major movements;

determining whether the object underwent the second type of movement includes determining, using the second feature data, that the object made a minor movement; and based at least in part on determining that the object made the minor movement, staying in the second mode for the threshold period of time.

8. The method of claim 1, wherein:

the first mode comprises a high-sensitivity mode in which the computing device is configured to detect minor movements;

determining a period of time during which motion is not detected in the environment;

generate, at least partly using the microphone, second data representing an ambient sound level in the environment during the period of time; and calculating a threshold value at least partly using the second data, wherein determining that the object made the first type of movement comprises determining that the object made a minor movement by:

determining, using the first feature data, a value indicating a likelihood that the first feature data represents the minor movement;

determining that the value is greater than or equal to the threshold value; and determining that the object underwent a minor movement based at least in part on the value being greater than or equal to the threshold value.

9. A system comprising:

a loudspeaker;

a microphone;

one or more processors; and one or more non-transitory computer-readable media storing computer-executable instructions that, when executed by the one or more processors, cause the one or more processors to perform operations comprising:

entering a first mode, wherein in the first mode the system is configured to detect a minor movement of an object;

causing, at a first time, the loudspeaker to emit a first ultrasonic signal into an environment of the system;

generating, at least partly using the microphone, first data representing a first reflected signal corresponding to the first ultrasonic signal, the first reflected signal originating at an object in the environment;

determining, at least partly by sampling the first data at a first frequency resolution, first feature data corresponding to the first reflection signal;

determining, using the first feature data, that the object underwent a minor movement;

entering a second mode, wherein in the second mode the system is configured to detect a major movement of the object;

causing, at a second time, the loudspeaker to emit a second ultrasonic signal;

generating, at least partly using the microphone, second data representing a second reflected signal corresponding to the second ultrasonic signal;

determining, at least partly by sampling the second data at a second frequency resolution that is different than the first frequency resolution, second feature data corresponding to the second reflection signal; and determining, using the second feature data, whether the object underwent the major movement.

10. The system of claim 9, the operations further comprising:

causing, at a third time prior to the second time, the loudspeaker to emit a third ultrasonic signal;

generating, at least partly using the microphone, third data representing a third reflected signal corresponding to the third ultrasonic signal;

determining third feature data corresponding to the third reflection signal;

determining, using the third feature data, that there has been no movement associated with the object for at least a threshold period of time; and entering the second mode based at least in part on there being no movement for at least the threshold period of time.

11. The system of claim 9, wherein determining that the object made the minor movement includes:

analyzing multiple portions of the first feature data, individual ones of the multiple portions representing different time periods;

determining that a first number of the multiple portions of the first feature data indicate that the object underwent a minor movement;

determining that a second number of the multiple portions of the first feature data indicate that no movement in the environment, wherein the first number is greater than the second number.

12. The system of claim 9, the operations further comprising:

analyzing multiple consecutive portions of the second feature data, individual ones of the multiple consecutive portions representing different time periods; and determining that the multiple consecutive portions of the second feature data each indicate that the object made a major movement.

13. The system of claim 9, further comprising a user device, the operations further comprising, prior to entering the first mode:

presenting a user interface on a display of the user device, the user interface including:

a first option associated with the first mode in which the system is configured to detect minor movements; and a second option associated with the second mode in which the system is configured to detect major movements; and receiving user input indicating a selection of the first option associated with the first mode.

14. The system of claim 9, wherein:

the system enters the second mode prior to entering the first mode; and determining whether the object underwent the major movement includes determining, using the second feature data, that the object made the major movement.

15. The system of claim 9, wherein the system enters the first mode for a threshold period of time, the operations further comprising, in response to determining that the object underwent the minor movement:

based at least in part on determining that the object made the minor movement, staying in the first mode for the threshold period of time.

16. The system of claim 9, wherein:

the first mode comprises a high-sensitivity mode in which the system is configured to detect minor movements; and the second mode comprises a low-sensitivity mode in which the system is configured to detect major movements and is associated with the second frequency resolution that is less than the first frequency resolution.

17. The system of claim 9, the operations further comprising:

determining a period of time during which motion is not detected in the environment;

generate, at least partly using the microphone, third data representing an ambient sound level in the environment during the period of time; and calculating a threshold value at least partly using the third data, wherein determining that the object made the minor movement comprises:

determining, using the first feature data, a value indicating a likelihood that the first feature data represents the minor movement.

18. A computing device comprising:

one or more processors; and one or more non-transitory computer-readable media storing computer-executable instructions that, when executed by the one or more processors, cause the one or more processors to perform operations comprising:

entering a first mode, wherein in the first mode the computing device is configured to detect a major movement of an object;

causing, at a first time, a loudspeaker to emit a first ultrasonic signal into an environment of the computing device;

generating, at least partly using a microphone, first data representing a first reflected signal corresponding to the first ultrasonic signal, the first reflected signal originating at an object in the environment;

determining, at least partly by sampling the first data at a first frequency resolution, first feature data corresponding to the first reflection signal;

determining, using the first feature data, that the object underwent a major movement;

entering a second mode, wherein in the second mode the computing device is configured to detect a minor movement of the object;

causing, at a second time, the loudspeaker to emit a second ultrasonic signal;

generating, at least partly using the microphone, second data representing a second reflected signal corresponding to the second ultrasonic signal;

determining, at least partly by sampling the second data at a second frequency resolution that is different than the first frequency resolution, second feature data corresponding to the second reflection signal; and determining, using the second feature data, whether the object underwent the minor movement.

19. The computing device of claim 18, the operations further comprising:

causing, at a third time prior to the second time, the loudspeaker to emit a third ultrasonic signal;

generating, at least partly using the microphone, third data representing a third reflected signal corresponding to the third ultrasonic signal;

determining third feature data corresponding to the third reflection signal;

determining, using the third feature data, that there has been no movement associated with the object for at least a threshold period of time; and entering the second mode based at least in part on there being no movement for at least the threshold period of time.

20. The computing device of claim 18, wherein determining that the object made the major movement includes:

analyzing multiple portions of the first feature data, individual ones of the multiple portions representing different time periods;

determining that a first number of the multiple portions of the first feature data indicate that the object underwent a major movement;

determining that a second number of the multiple portions of the first feature data indicate that no movement in the environment, wherein the first number is greater than the second number.

\* \* \* \* \*